United States Patent
Nakamura et al.

(10) Patent No.: US 8,896,550 B2
(45) Date of Patent: Nov. 25, 2014

(54) NAVIGATION SYSTEM

(75) Inventors: Fumitake Nakamura, Kobe (JP); Noriyuki Kamikawa, Kobe (JP); Takahiro Nakagawa, Kobe (JP); Satoru Nagamoto, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 295 days.

(21) Appl. No.: 13/121,594

(22) PCT Filed: Sep. 29, 2009

(86) PCT No.: PCT/JP2009/066986
§ 371 (c)(1),
(2), (4) Date: Mar. 29, 2011

(87) PCT Pub. No.: WO2010/038752
PCT Pub. Date: Apr. 8, 2010

(65) Prior Publication Data
US 2011/0181540 A1    Jul. 28, 2011

(30) Foreign Application Priority Data

Sep. 30, 2008 (JP) ................................. 2008-253665

(51) Int. Cl.
G06F 3/041 (2006.01)
G01C 21/26 (2006.01)
G09B 29/00 (2006.01)
G09B 29/10 (2006.01)

(52) U.S. Cl.
CPC .............. *G01C 21/26* (2013.01); *G01C 21/265* (2013.01); *G09B 29/007* (2013.01);
(Continued)

(58) Field of Classification Search
USPC ......... 345/173, 174–179, 156–158, 168–169; 361/679.01–679.61, 644; 454/155; 318/268; 701/208, 1, 540; 178/18.01–18.09; 463/37–38; 369/30.32
See application file for complete search history.

(56) References Cited

U.S. PATENT DOCUMENTS 6,747,364 B1    6/2004 Shibuya et al.
(Continued)

FOREIGN PATENT DOCUMENTS

JP    A-2000-222868    8/2000
JP    A-2004-004104    1/2004
(Continued)

OTHER PUBLICATIONS

International Search Report in International Application No. PCT/JP2009/066986; dated Jan. 12, 2010 (with English-language translation).

(Continued)

*Primary Examiner* — Lun-Yi Lao
*Assistant Examiner* — MD Saiful A Siddiqui
(74) *Attorney, Agent, or Firm* — Oliff PLC

(57) ABSTRACT

A navigation system is provided. A medium insertion port is disposed on the front surface of a main unit and a portable recording medium is loaded into or unloaded from the main unit through the medium insertion port. A display unit is disposed on the front surface of the main unit and can move between a closed position where the medium insertion port is covered and an opened position where the medium insertion port is exposed. A limitation section limits the movement of the display unit to the opened position. A limitation removing section removes the limitation by the limitation section. An operation section receives an operation on the navigation system. The operation section can receive an operation other than an operation to be intrinsically received by the operation section. The limitation removing section removes the limitation by the limitation section when the operation section receives the operation other than the operation to be intrinsically received.

15 Claims, 19 Drawing Sheets

(52) U.S. Cl.
CPC ..................................... *G09B 29/10* (2013.01)
USPC ........ 345/173; 345/174; 345/179; 178/18.06; 361/679.29; 361/679.33; 701/1; 701/540; 369/30.32

(56) References Cited

U.S. PATENT DOCUMENTS

| | | | |
|---|---|---|---|
| 7,583,567 B2 | 9/2009 | Ogasawara et al. | |
| 7,623,418 B2 | 11/2009 | Hashimoto et al. | |
| 2005/0207311 A1* | 9/2005 | Kobayashi | 369/75.11 |
| 2006/0146032 A1* | 7/2006 | Kajimoto et al. | 345/173 |
| 2006/0227674 A1* | 10/2006 | Hashimoto et al. | 369/30.32 |
| 2007/0047399 A1* | 3/2007 | Ogasawara et al. | 369/30.32 |
| 2007/0213092 A1* | 9/2007 | Geelen | 455/556.1 |
| 2007/0225905 A1* | 9/2007 | Yamashita et al. | 701/208 |
| 2007/0243813 A1* | 10/2007 | Nakamura | 454/155 |
| 2008/0077310 A1* | 3/2008 | Murlidar et al. | 701/117 |

FOREIGN PATENT DOCUMENTS

| | | |
|---|---|---|
| JP | A-2004-272956 | 9/2004 |
| JP | A-2004-334284 | 11/2004 |
| JP | A-2005-38487 | 2/2005 |
| JP | A-2005-075108 | 3/2005 |
| JP | A-2007-058995 | 3/2007 |
| JP | A2008-191016 | 8/2008 |
| WO | WO 2008/096704 A1 | 8/2008 |

OTHER PUBLICATIONS

Japanese Office Action issued in Japanese Patent Application No. 2008-253665 dated Feb. 5, 2013 (w/ partial translation).
Apr. 6, 2012 Office Action issued in Chinese Patent Application No. 200910137576.1; with English-language translation.
May 7, 2013 Office Action issued in Japanese Patent Application No. 2008-253665 (with partial translation).
European Search Report dated Jul. 21, 2014 issued in EP Application No. 09 81 7784.

\* cited by examiner

FIG. 25

| BUTTON TYPE | BUTTON DETAILS | INTRINSIC | | UPDATED | |
|---|---|---|---|---|---|
| FUNCTION BUTTON | SWITCHING BUTTON 24a | SHORT-PRESSING | POP-UP OPERATION PICTURE | SHORT-PRESSING | POP-UP OPERATION PICTURE |
| SOFT BUTTON | | LONG-PRESSING | NO FUNCTION | LONG-PRESSING | FULLY-OPENED |
| | CD LOAD BUTTON | SHORT-PRESSING | SEMI-OPENED | SHORT-PRESSING | SEMI-OPENED |
| | CLOSE BUTTON | SHORT-PRESSING | CLOSED | SHORT-PRESSING | CLOSED |
| | FULL OPEN BUTTON | SHORT-PRESSING | FULLY-OPENED | NO DISPLAY | NO FUNCTION |

NAVIGATION SYSTEM

TECHNICAL FIELD

The present invention relates to a navigation system.

BACKGROUND ART

A navigation system searches for a route on the basis of destination information such as an address, a name, and a phone number for specifying a destination and current position information. A navigation system generally includes an access device to a portable recording medium, reads map data and spot information representing a spot on a map from the portable recording medium, and searches for a route. Some navigation systems may provide supplementary information such as recommended foods information of restaurants at the time of guidance on a route. Since such supplementary information varies more frequently than the map data of roads and the like, means for providing the latest supplementary information is necessary in addition to the recording medium. For example, PTL 1 proposes a navigation system providing the latest supplementary information by communications.

CITATION LIST

Patent Literature

[PTL 1] JP-A-2004-4104

SUMMARY OF THE INVENTION

Technical Problem

Examples of users of navigation systems include personal users and companies providing commercial services using vehicles, such as real-estate business, bottle rounds, and insurance business using vehicles. Examples of the users of navigation systems include companies providing a car rental service. Here, regarding a navigation system mounted on a rented car, there is a concern that a user may carry off a portable recording medium (for example, a DVD) storing map data. Therefore, in some usages of a navigation system, there is a need for a function of limiting the loading and unloading of a portable recording medium received in the navigation system.

As described above, examples of the users of navigation systems include providers providing a car rental service as well as personal users. Therefore, it can be considered that a device limiting the loading and unloading of a portable recording medium is provided to navigation systems for a specific company. However, when the hardware structure of a navigation system is changed depending on the users, the cost thereof increases. In consideration of the cost, it is preferable that navigation systems have substantially the same hardware structure without depending on the users.

In view of the above-mentioned problem, a goal of the invention is to provide a technique of embodying a common hardware structure of a navigation system without depending on the users and regulating the loading and unloading of a portable recording medium received in a navigation system depending on the users. Another goal of the invention is to provide a technique of embodying a common hardware structure of a navigation system without depending on the users and customizing functions of a navigation system in response to a company's request when a user (owner) is the company such as a provider providing a car rental service.

Solution to the Problem

To achieve the above-mentioned goal, the invention provides means for limiting the loading and unloading of a portable recording medium to a navigation system and allocates to an operation section a function of removing the limitation by a specific operation outer than an operation to be intrinsically received by the operation section. Accordingly, the invention can limit a specific user's unloading of a portable recording medium received in a navigation system without changing a hardware structure of the navigation system depending on the users.

That is, according to a first aspect of the invention, there is provided a navigation system including: a main unit; a medium insertion port that is disposed on the front surface of the main unit and through which a portable recording medium is loaded into or unloaded from the main unit; a display unit that is disposed on the front surface of the main unit and that can move between a closed position where the medium insertion port is covered and an opened position where the medium insertion port is exposed; a limitation section that limits the movement of the display unit to the opened position; a limitation removing section that removes the limitation by the limitation section; and an operation section that receives an operation on the navigation system, wherein the operation section can receive an operation other than an operation to be intrinsically received by the operation section, and the limitation removing section removes the limitation by the limitation section when the operation section receives the operation other than the operation to be intrinsically received.

Here, the closed position is a position where the display unit covers the medium insertion port and thus a user cannot view the medium insertion port, that is, a position where the display unit covers the medium insertion port and thus a user cannot load and unload the portable recording medium into and out of the medium insertion port. The opened position is a position where the medium insertion port is exposed and thus a user can view the medium insertion port, that is, a position where the medium insertion port is exposed and thus the user can load and unload the portable recording medium into and out of the medium insertion port. Here, the user is a user of the navigation system, for example, a passenger of a vehicle mounted with the navigation system.

Here, the "operation to be intrinsically received" is a normal operation for performing a predetermined function intrinsically allocated to the operation section, for example, a short-pressing operation. The "operation other than the operation to be intrinsically received" is a special operation for performing a special function (a specific function not intrinsically allocated) other than the predetermined function intrinsically allocated to the operation section, for example, a long-pressing operation. This special operation can be accepted and different functions are performed when the short-pressing operation and the long-pressing operation are received. The above-mentioned navigation system according to the invention exhibits particularly excellent effects in such a usage where a user of the navigation system is not the owner thereof like a rented car. When the navigation system is mounted on a rented car, it is possible to prevent the theft of the portable recording medium, which was a problem in the related art. Accordingly, it is preferable that the operation other than the intrinsically-allocated operation is an operation known only to the owner of the navigation system.

Here, the display unit may include a touch panel on which first operation buttons as immaterial objects receiving the operation on the navigation system are displayed and the operation section may include second operation buttons as material objects disposed in the display unit. The first buttons as the material objects can be operated, for example, without supplying power thereto, unlike the second operation buttons as the immaterial objects displayed on the touch panel. Accordingly, it is possible to limit the acquirement of the portable recording medium and to reduce the labor of the unloading operation at the time of unloading the portable recording medium.

The touch panel may be able to display a move button for causing the display unit to move to the opened position and the limitation section may limit the movement of the display unit to the opened position by limiting the display of the move button. Accordingly, it is possible to embody a common hardware structure of the navigation system and to limit the acquirement of the portable recording medium.

The portable recording medium may include a first portable recording medium storing map information and a second portable recording medium storing update information other than the map information and the medium insertion port may include a first medium insertion port through which the first portable recording medium is loaded and unloaded and a second medium insertion port through which the second portable recording medium is loaded and unloaded. Here, the position of the first medium insertion port on the front surface of the main unit may be different from the position of the second medium insertion port and the display unit may be able to move among the closed position where both the first medium insertion port and the second medium insertion port are covered, a semi-opened position where only one of the first medium insertion port and the second medium insertion port is covered by the display unit, and the opened position where both the first medium insertion port and the second medium insertion port are exposed. Accordingly, it is possible to limit the acquirement of only one portable recording medium, for example, when plural portable recording mediums having different usages can be loaded into the navigation system.

The navigation system may further include: an information acquiring section that acquires predetermined information stored in the portable recording medium; and a change section that changes the other operation on the basis of change information when the predetermined information includes the change information for changing the operation other than the operation to be intrinsically received. Accordingly, it is possible to easily change the "operation other than the operation to be intrinsically received" as needed, thereby more satisfactorily preventing the theft of the portable recording medium.

According to a second aspect of the invention, there is provided a navigation system including: a main unit; a medium insertion port that is disposed on the front surface of the main unit and through which a portable recording medium storing update information for updating a function of the navigation system is loaded into or unloaded from the main unit; a display unit that is disposed on the front surface of the main unit, that displays an operation button for receiving an operation on the navigation system by the use of a touch panel, and that can move between a closed position where the medium insertion port is covered and an opened position where the medium insertion port is exposed by the operation of the operation button; an operation section that receives the operation on the navigation system; a limitation section that limits the movement of the display unit based on the operation of the operation button on the basis of the update information stored in the portable recording medium; and a change section that changes the movement of the display unit, which is limited by the limitation section, based on the operation of the operation button so as to allow the movement by the use of the operation section on the basis of the update information stored in the portable recording medium. The operation changed by the change section may be carried out when the operation section receives an operation other than an operation to be intrinsically received by the operation section. The operation other than the operation to be intrinsically received may be an operation of long-pressing the operation section. The display unit may not display the operation button when the movement is limited by the limitation section. In addition, the invention may be embodied as a method or a program for implementing the processes performed by the navigation system.

The invention may be embodied as a computer-readable recording medium having recorded thereon the program. In this case, the functions can be performed by allowing a computer and the like to read and execute the program recorded on the recording medium. The computer-readable recording medium is a recording medium which can store information data or programs by electrical, magnetic, optical, mechanical, or chemical operations and from which the information can be read by the computer or the like.

Advantageous Effects of Invention

According to the configurations of the invention, it is possible to provide a technique of embodying a common hardware structure of a navigation system and regulating the loading and unloading of a portable recording medium received in a navigation system depending on the users. It is also possible to provide a technique of embodying a common hardware structure of a navigation system without depending on the users and customizing functions of a navigation system in response to a company's request when a user is a company such as a provider providing a car rental service.

BRIEF DESCRIPTION OF DRAWINGS

FIG. 25 is a diagram illustrating operation allocation data.

DESCRIPTION OF EMBODIMENTS

Hereinafter, a car navigation system according to an embodiment of the invention will be described specifically. A navigation system 1 is not limited as to the vehicles to be mounted therewith, but it is assumed hereinafter that it is mounted on a rented car provided by a car rental company. The assumption of the car rental company has been made because it has a strong requirement for customizing the functions of a car navigation system. The following embodiments are only examples and the invention is not limited to the embodiments.

System Configuration

Figure 1:
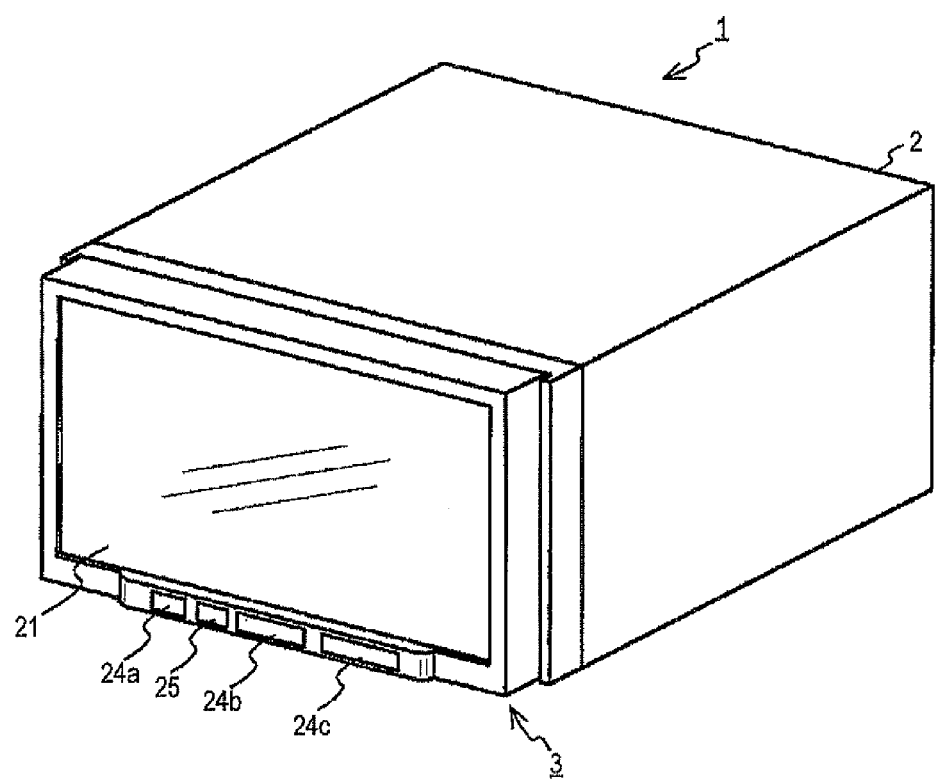
FIG. 1 is a diagram illustrating the appearance of a navigation system.

FIG. 1 is a diagram illustrating the appearance of a navigation system 1 according to an embodiment of the invention. The navigation system 1 is a car navigation system in which a body and a monitor form a single body according to the 2DIN (Deutsche Industrie Normen) and has a car navigation function of displaying a current position of a vehicle or guiding the vehicle along a route to a destination, a function of reproducing various audio/visual (hereinafter, referred to as "AV") contents, a function of receiving broadcast waves, and the like. The navigation system 1 is disposed in the vicinity of the center of a dashboard which can be easily reached by a passenger's hand in either the driver's seat or passenger's seat and includes a main unit 2 and a display unit 3. An example of such a navigation system is a vehicle-mounted navigation system such as AVN (Audio Visual Navigation, registered trademark) made by FUJITSU TEN LIMITED.

Figure 2:
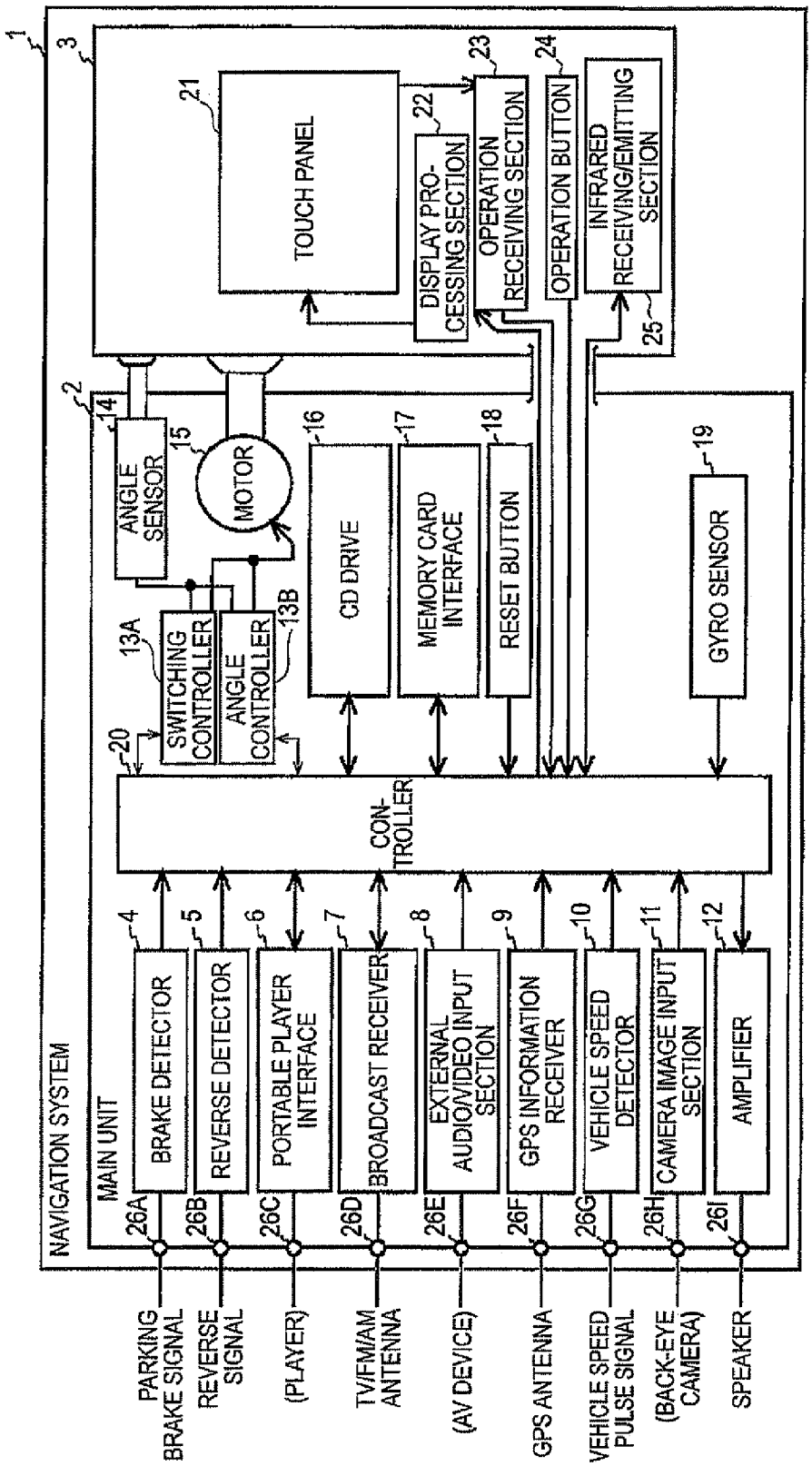
FIG. 2 is a diagram illustrating a navigation system.

FIG. 2 is a configuration diagram of the navigation device 1. The main unit 2 includes electronic components, and is embedded with a brake detection section 4, a reverse detection section 5, a portable player interface 6, a broadcast wave receiving section 7, an external sound/image input section 8, a GPS information receiving section 9, a vehicle speed detection section 10, a camera image input section 11, an amplifier 12, a switching controller 13A, an angle control section 13B, an angle sensor 14, a motor 15, a CD drive 16, a card memory interface 17, a reset button 18, a gyro sensor 19, and a control section 20. The display unit 3 mainly displays various kinds of information regarding the passengers of the vehicle in the form of an image, and includes devices which play a role of receiving a user's operation. The display unit 3 is embedded with a touch panel 21, a display processing section 22, an operation receiving section 23, an operation button 24, and an infrared ray receiving/emitting unit 25.

Hereinafter, the configuration of the main unit 2 will be described. The brake detection section 4 detects whether or not the parking brake of the vehicle is applied, and notifies the detection result to the control section 20. The brake detection section 4 detects the state of the brake from the conduction state of a switch which is switched on/off in interlocking with the motion of the parking brake lever (or pedal). The brake detection section 4 electrically detects the conduction state of the switch through a terminal 26A.

The reverse detection section 5 detects whether or not the gearshift of the vehicle is at the reverse position (backward movement) and notifies the detection result to the control section 20. The reverse detection section 5 detects the state of the gearshift from the on/off of a switch which moves in interlocking with the gearshift. The reverse detection section 5 electrically detects the conduction state of the switch through a terminal 26B.

The portable player interface 6 is an interface for bidirectional communication with a portable player (for example, iPOD (Registered Trademark) which reproduces music or the like. If a portable player is externally connected, the portable player interface 6 starts bidirectional communication to send an audio signal from the player to the control section 20 and to send a control signal, such as reproduction start or music selection, from the control section 20 to the player. The portable player interface 6 performs communication with the player through a cord connected to a terminal 26C.

The broadcast wave receiving section 7 is a circuit which includes an AM (Amplitude Modulation) tuner, and an FM (Frequency Modulation) tuner. The broadcast wave receiving section 7 controls the reception state of the tuner in accordance with the control signal from the control section 20 and sends signals of electric waves received by an antenna connected to a terminal 26D to the control section 20. The broadcast wave receiving section 7 may include a One Seg tuner (the application for trademark registration for "One Seg" is pending).

The external sound/image input section 8 is a circuit which receives a composite image signal or sound signal from a video/audio equipment connected to a terminal 26E and sends the composite image signal or sound signal to the control section 20.

The GPS (Global Positioning System) information receiving section 9 receives signals of electric waves from a GPS satellite received by a GPS antenna connected to a terminal 26F and sends the received signal to the control section 20. As well known in the art, the GPS is the system which measures the position of the vehicle on the basis of electric waves from at least three satellites from among many GPS satellites circulating the earth. The GPS information receiving section 9 processes the signals of electric waves of the GPS satellites circulating the earth. The signals from the GPS satellites received by the GPS information receiving section 9 are used in car navigation.

The vehicle speed detection section 10 is a circuit which detects a vehicle speed pulse signal generated in accordance with the rotation angle of the axle and sends the vehicle speed pulse signal to the control section 20. The vehicle speed pulse signal detected by the vehicle speed detection section 10 is a step-like vehicle speed pulse signal which is output from a vehicle speed sensor or an electronic control unit controlling the engine or brake of the vehicle, and is used in determining the vehicle speed from the number of pulses per unit time. If the number of pulses per unit time increases, the vehicle is accelerating, and if the number of pulses per unit time decreases, the vehicle is decelerating. The correlation between the speed of the vehicle and the vehicle speed pulses changes depending on the manufacturer who manufactures the vehicle, the vehicle type, the size of each wheel to be mounted, air pressure, or the like. For this reason, in the control section 20, the correlation between the speed of the vehicle and the vehicle speed pulses is appropriately updated from the correlation between the traveling distance of the vehicle calculated on the basis of the positioning result by the GPS and the number of pulses detected during traveling. The vehicle speed detection section 10 electrically detects the vehicle speed pulse signal output from the electronic control unit through a terminal 26G.

The camera image input section 11 is a circuit which receives an image signal from a rear-view camera which is a video camera photographing the rear side of the vehicle and sends the image signal to the control section 20. That is, when the reverse detection section 5 detects the reverse of the vehicle, the camera image input section 11 sends an image signal from the video camera connected to a terminal 26H to the control section 20.

The amplifier 12 is a circuit which amplifies a sound signal sent from the control section 20 to a speaker connected to a terminal 26I in the vehicle interior. The amplifier 12 can arbitrarily change the amplification factor in accordance with the control signal from the control section 20.

Figure 3:
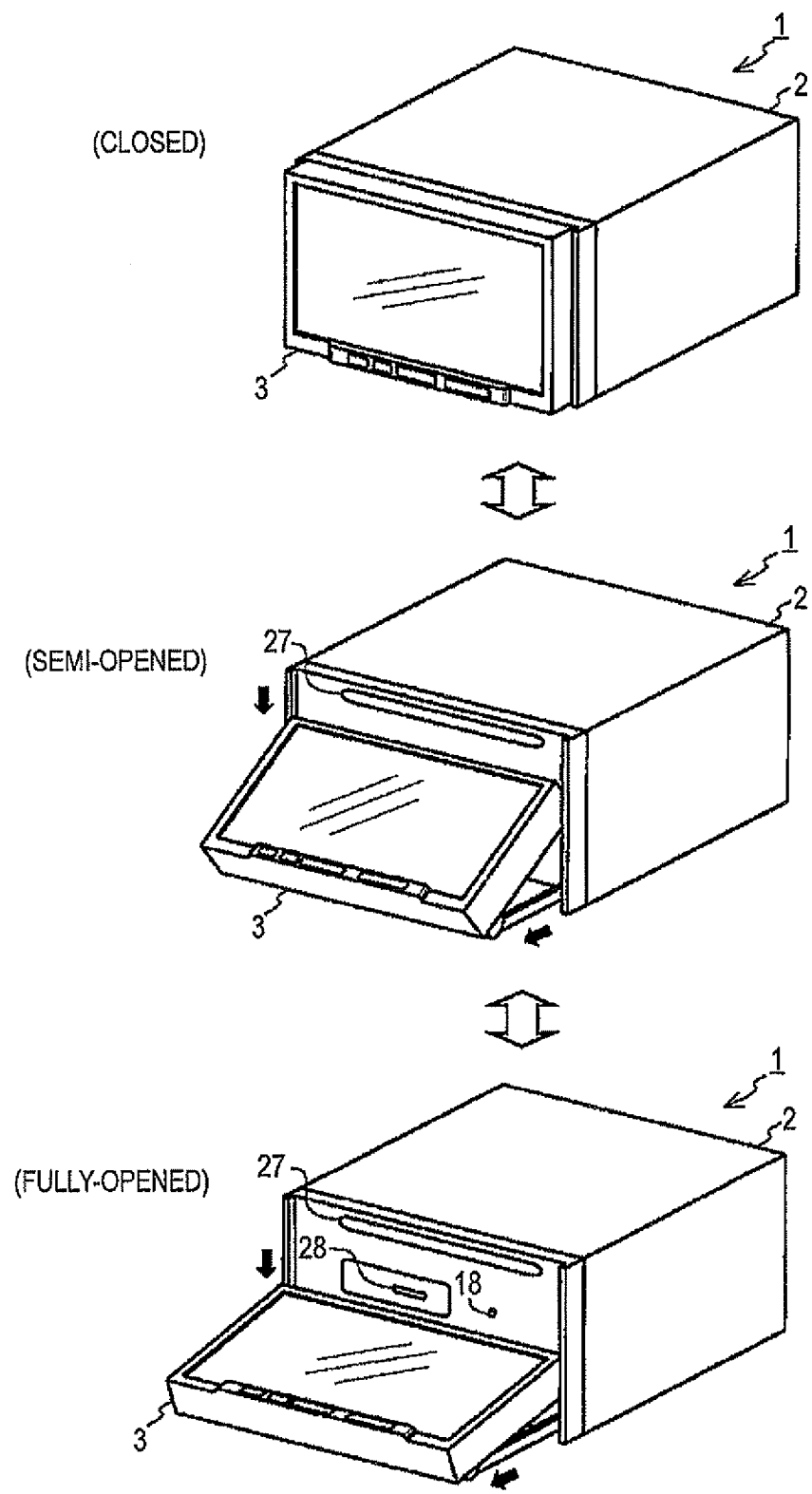
FIG. 3 is a diagram illustrating the behavior of a display unit.

The switching controller 13A is a circuit which carries out an opening/closing operation of the display unit 3. The switching controller 13A controls the motor 15 in accordance with the control signal from the control section 20 or processes the signal from the angle sensor 14 to open/close the display unit 3. FIG. 3 shows the opening/closing operation of the display unit 3 which is realized when the switching controller 13A controls the motor 15 when receiving the control signal from the control section 20. As shown in FIG. 3, the switching controller 13A can adjust the pose of the display unit 3 in three stages and realizes a "close state" where a CD insertion slot 27 of the CD (Compact Disc) drive 16 is closed, a "semi-open" state where the CD insertion slot 27 of the CD drive 16 is open, and a "full open" state where a card insertion slot 28 of the card memory interface 17 or the reset button 18 is open. When the pose of the display unit 3 is in the "close" state, the CD insertion slot 27 or the card insertion slot 28 and the reset button 18 are hidden by the display unit 3. When the pose of the display unit 3 is in the "semi-open" state, the card insertion slot 28 or the reset button 18 is hidden by the display unit 3, and access can be made to the CD insertion slot 27 from the front side of the navigation device 1. When the pose of the display unit 3 is in the "full open" state, access can be made to the CD insertion slot 27, the card insertion slot 28, and the reset button 18 from the front side of the navigation device 1.

In the navigation system 1 according to this embodiment, the change to a "closed" state, a "semi-opened" state, and an "opened" state is controlled by a controller 20 and a switching controller 13A. Here, when the position of the display unit 3 in the "closed" state is called a closed position, the position of the display unit 3 in the "semi-opened" state is called a semi-opened position, and the position of the display unit 3 in the "full-opened" state is called an opened position, the display unit 3 can move among the closed position where the CD insertion port 27, the card insertion port 28, and the reset button 18 are covered, the semi-opened position where the card insertion port 27 and the reset button 18 are covered and the CD insertion port 27 is exposed, and the opened position where the CD insertion port 27, the card insertion port 28, and the reset button 18 are exposed. In this embodiment, the position of the display unit 3 can be adjusted in three steps, but is not limited to three steps. When the functions of the navigation system are restricted and for example, the card insertion port 28 and the reset button 18 are not provided, the display unit 3 need not be changed to the "semi-opened" state and the display unit 3 may move between the closed position and the opened position. In this embodiment, only the CD insertion port 27 is exposed at the "semi-opened" position, but the invention is not limited to this configuration. By exchanging the positions of the CD insertion port 27 and the card insertion port 28 with each other, only the card insertion port 28 may be exposed in the "semi-opened" state.

The angle control section 13B is a circuit which adjusts the angle of the display unit 3. Similarly to the switching controller 13A, the angle control section 13B controls the motor 15 in accordance with the control signal from the control section 20 or processes the signal from the angle sensor 14 to adjust the angle of the display unit 3. The angle of the display unit 3 refers to the relative angle the front side of the main unit 2 and the front side of the display unit 3 (that is, the front side of the touch panel 21) centering on the axis extending in the left-right direction of the navigation device 1. The angle control section 13B adjusts the elevation angle of the display unit 3 in multiple stages to tilt up the display unit 3.

The angle sensor 14 is a sensor which detects the angle of the display unit 3, and notifies the detected angle as an electrical signal to the switching controller 13A and the angle control section 13B. The motor 15 is a motor which adjusts the angle of the display unit 3, and moves up or down the upper end of the display unit 3 or moves the lower end of the display unit 3 forward and backward. If receiving the control signal from the control section 20, the switching controller 13A and the angle control section 13B determines the difference between the angle of the display unit 3 detected by the angle sensor 14 and the target value of the angle determined on the basis of the control signal, and performs feedback control of the motor 15 such that the angle of the display unit 3 detected by the angle sensor 14 coincides with the control target value.

The CD drive 16 is an optical disk reading device which reads a CD having recorded therein audio contents, such as music, and reproduces audio contents, and includes an optical pickup lens or light-emitting element, a disk driving motor, and the like.

The card memory interface 17 is a memory card reader/writer which reads and writes a nonvolatile semiconductor memory card. The control section 20 accesses the memory card inserted into the card memory interface 17 and obtain data recorded in the memory card to realize all functions, route search of car navigation.

The memory card has a memory capacity of about 4 GB, and is divided and managed into a standard memory area storing standard data and a customized memory area storing application data which can be changed by a user. Map data including road information about expressways and general roads, spot information (hereinafter, also referred to as "POI data") on various buildings, such as theme parks and service stations, and the like, audio data for guidance on a route, and detailed information (hereinafter, also referred to as "detailed POI data") on various buildings, such as phone numbers, building names, and addresses, are recorded in the standard memory area. The detailed POI data includes icon data of the POIs. The POI data and the detailed POT data correspond to the map data in the invention. On the other hand, application data is stored in the customized memory area. The application data includes opening picture data, use agreement data, notice data, and POI data. Hereinafter, the opening picture data and the POI data included in the application data are referred to as update opening picture data and additional POI data, respectively. The additional POI data includes data of the same type as the POI data and the detailed POI data stored in the standard memory area. The data included in the application may be divided into individual files in predetermined formats and may be identified, or plural pieces of data may be stored in a single file and may be identified by predetermined offsets.

The application data stored in the customized memory area can be generated and edited by a dedicated application executed by a computer such as a personal computer. For example, a person in charge of a car rental company edits the application data using the dedicated application, stores the edited application data in a memory card, and inserts the memory card into the card insertion port 28 of the memory card interface 17. The method of using the application data will be described later. The data stored in the standard memory area is not allowed to be changed by the user such as the car rental company.

The gyro sensor 19 is a biaxial gyro sensor which is embedded in the main unit 2. The gyro sensor 19 enables vehicle positioning even when the GPS information receiving section 9 cannot receive the electric waves from the GPS satellites. When it is impossible to receive the electric waves from the UPS satellites, the control section 20 calculates the position of the vehicle is calculated on the basis of the vehicle speed detected by the vehicle speed detection section 10 and the traveling direction of the vehicle detected by the gyro sensor 19.

The control section 20 includes a CPU (Central Processing Unit), a ROM (Read Only Memory), a RAM (Random Access Memory), an input/output interface, and the like. If the accessory power supply of the vehicle is turned on, the control section 20 executes a computer program recorded in the ROM to realize various functions by using data of the memory card inserted into the card memory interface 17, data stored in the RAM, or the like. The details of various functions which are realized by the control section 20 will be described below.

Next, the constituent elements constituting the display unit 3 will be described. The touch panel 21 is a GUI (Graphical User Interface) in which a color liquid crystal display and a touch sensor are combined. In the touch panel 21, the screen is displayed with a 7.0-inch EGA (Enhanced Graphics Adapter) liquid crystal display, and if an icon or the like displayed on the screen is depressed, the touch sensor detects the depressing.

The display processing section 22 is a circuit which draws a screen to be displayed on the liquid crystal display of the touch panel 21. The display processing section 22 drives thin-film transistors arranged in the liquid crystal display in a lattice at uniform intervals on the basis of an image signal sent from the control section 20, and draws the screen of the touch panel 21.

If the touch sensor detects a touch operation on the touch panel 21, the operation receiving section 23 specifies the touched position on the screen and sends information of the specified position to the control section 20.

The operation buttons 24 are not buttons (button images) displayed as icons on the touch panel 21 but mechanical buttons, and are push button type switches for operation disposed below the touch panel 21 as shown in FIG. 1 and the like. The buttons displayed as icons on the touch panel 21 are immaterial objects, but the operation buttons 24 are material objects. The operation buttons 24 include a switching button 24a, a current position button 24b, and a volume control button 24c sequentially from the left side of the display unit 3.

A volume goes up when the right side of the volume control button is pressed, and the volume goes down when the left side thereof is pressed. When such buttons are pressed, a signal of the pressed button is sent to the controller 20.

Figure 26A:
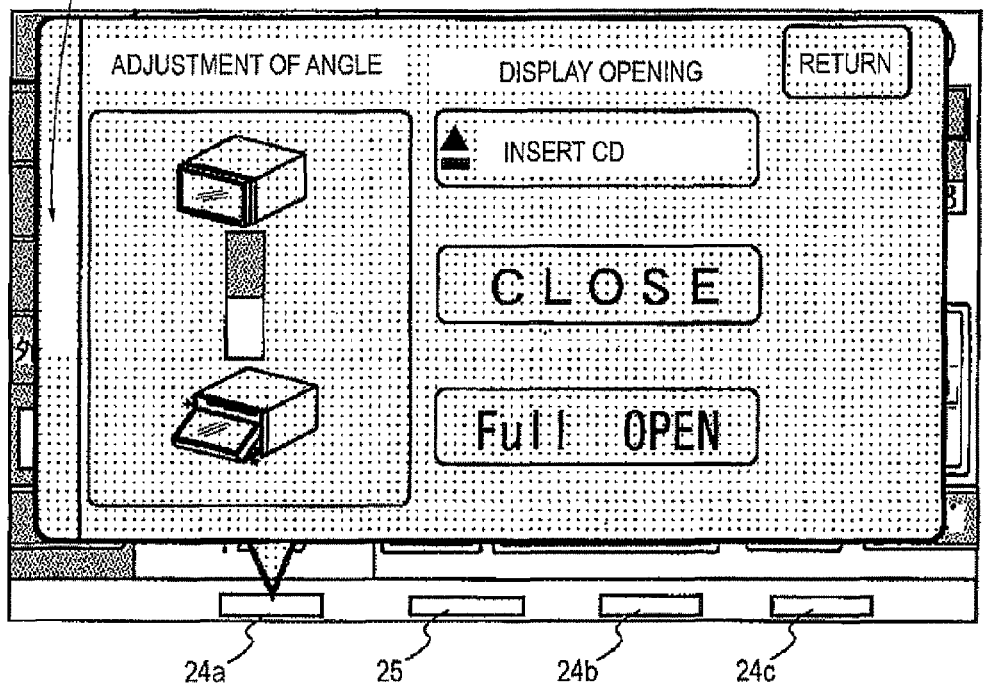
FIG. 26A is a diagram illustrating a pre-update operation picture as a comparative example of FIG. 26B.
Figure 26B:
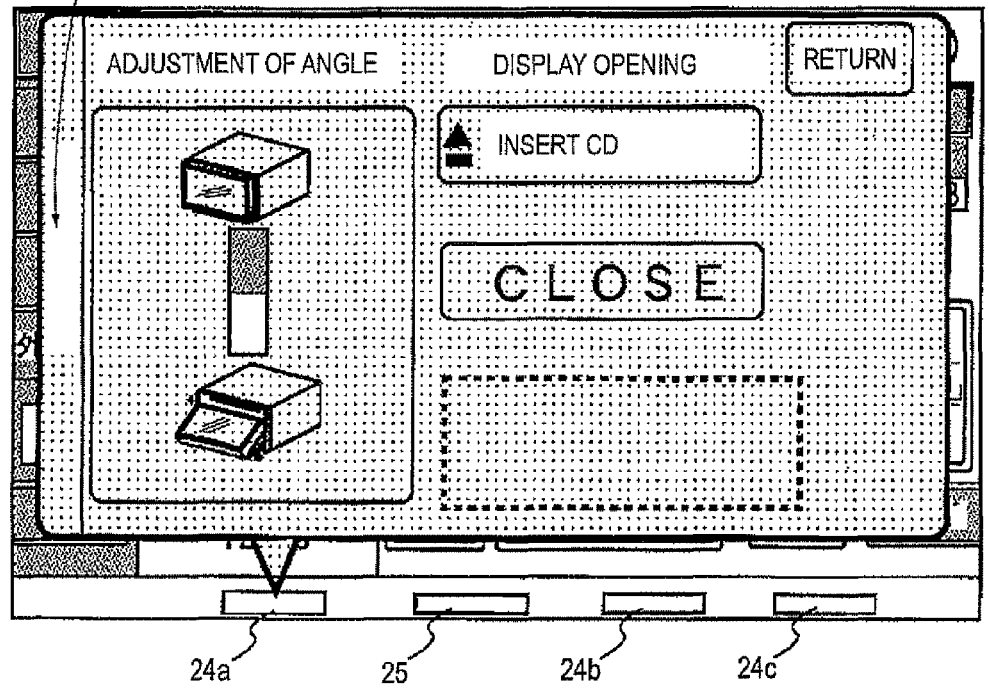
FIG. 26B is a diagram illustrating a switching operation picture updated on the basis of operation allocation update data.

In the navigation system 1 according to this embodiment, a full opening operation in the switching operation picture displayed by pressing the switching button 24a is limited (see FIGS. 26A and 26B). The function of changing the display unit to the "fully-opened" state is allocated as a new function to the long-pressing operation on the switching button 2a. The process of changing the display unit to the respective states will be described later.

The infrared receiving/emitting section 25 is an interface for perform bidirectional communication between the navigation system 1 and a mobile phone by infrared and includes a light-emitting element emitting an infrared ray by electricity and a light-receiving element converting the received infrared ray into electricity. The infrared receiving/emitting section 25 sends a control signal or data from the controller 20 to the mobile phone and sends a control signal or data from the mobile phone to the controller 20. The infrared receiving/emitting section 25 is disposed below the touch panel 21 as shown in FIG. 1.

Figure 4:
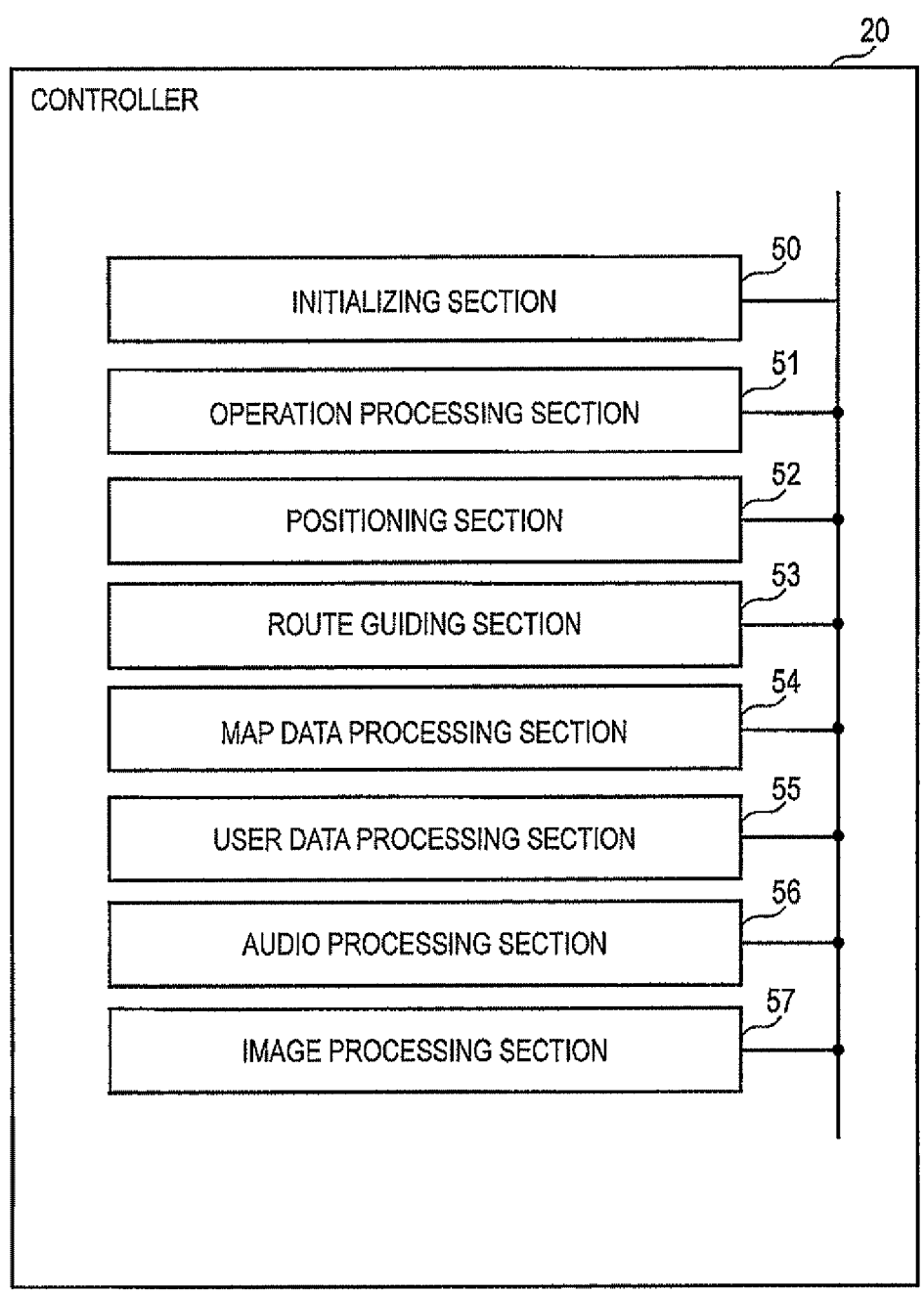
FIG. 4 is a functional block diagram illustrating various functions embodied by a controller.

Various functions embodied by the controller of the main unit 2 will be described below in detail. FIG. 4 is a functional block diagram illustrating various functional sections embodied by the controller 20. When an accessory power source of a vehicle is turned on, the controller 20 executes a computer program embodying an initializing section 50, an operation processing section 51, a positioning section 52, a route guiding section 53, a map data processing section 54, a user data processing section 55, an audio processing section 56, and an image processing section 57 shown in FIG. 4.

The initializing section 50 performs an initializing process of the navigation system 1. The initializing section 50 checks, for example, a hardware disorder of the navigation system 1 as the initializing process. When a hardware disorder is detected, the initializing section 50 displays a warning picture representing the disordered state. The initializing section 50 displays an opening picture while continuing to perform the initializing process. When the initializing process is ended, the initializing section 50 instructs the image processing section 57 to close the opening picture and to display a predetermined picture.

The operation processing section 51 displays an operation picture for controlling the behavior of various functional sections on the touch panel 21 via the image processing section 57, or processes an operation signal from the operation receiving section 23, the operation buttons 24, or the reset button 18 to control the behavior of various functional sections.

The operation processing section 51 serves as the limitation section, the limitation removing section, and the change section of the invention. That is, the operation processing section 51 limits an intrinsic function (change to the "fully-opened" state) in the switching operation picture displayed on the touch panel, removes the limitation when the switching button 24a is long-pressed to change the display unit to the "fully-opened" state.

When the accessory power source of the vehicle is turned on, the positioning section 52 measures the position (latitude and longitude) of the vehicle on the basis of information on electric waves from a satellite sent from a GPS information receiver 9, information of a vehicle speed sent from a vehicle speed detector 10, and information on an angular velocity sent from a gyro sensor 19.

The route guiding section 53 is a functional section searching for a route from the current position of the vehicle to the destination set by the user and guiding the vehicle along the route. The route guiding section 53 searches the map data in the memory card inserted into the memory card interface 17 for a traveling route form the position of the vehicle measured by the positioning section 52 to the destination. The route guiding section 53 determines a course of the vehicle from the relation between the searched traveling route and the position of the vehicle and reads the audio data or the map image data for the route guidance from the memory card on the basis of the determined path. The route guiding section 53 performs route guidance by audio and video by sending the read audio data to the audio processing section 56 and sending the read map image data to the image processing section 57.

The map data processing section 54 generates graphic data of the map to be displayed on the touch panel 21 on the basis of map data read from the standard memory area of the memory card, data of the traveling route searched for by the route guiding section 53, data of road traffic information of VICS (registered trademark) acquired from FM broadcast waves via the broadcast receiver 7, and position data of the vehicle measured by the positioning section 52.

The user data processing section 55 stores spot information (for example, position information of a return place) to be registered by the user, route search history information, and setting information of on icon display or non-display in a RAM or reads the information from the RAM.

The audio processing section 56 is a functional section processing an audio signal output from a speaker via an amplifier 12. That is, the audio processing section 56 sends the radio broadcast received by the broadcast receiver 7, the audio signal acquired from a player by the portable player interface 6, and the audio signal reproduced by the CD drive 16, or overlaps the route guidance audio signal from the route guiding section 53 with the audio signals and sends the overlapped audio signals to the amplifier 12.

The image processing section 57 is a functional section generating image data to be displayed on the touch panel 21. That is, the image processing section 57 overlaps data of a display map picture generated by the map data processing section 54 with data of the operation picture generated by the operation processing section 51 sends the overlapped data to the display processing section 22, or sends the image data of the television broadcast received by the broadcast receiver 7 to the display processing section 22, or sends the image signal from a camera image input section 11 to the display processing section 22 with the detection of a vehicle reverse by a reverse detector 5. The image processing section 57 stops the sending of the image data when a brake detector 4 detects the release of a parking brake at the time of sending the image data of the television broadcast to the display processing section 22.

Example of Behavior

An example of the behavior of the navigation system 1 will be described below.

Starting

Figure 5:
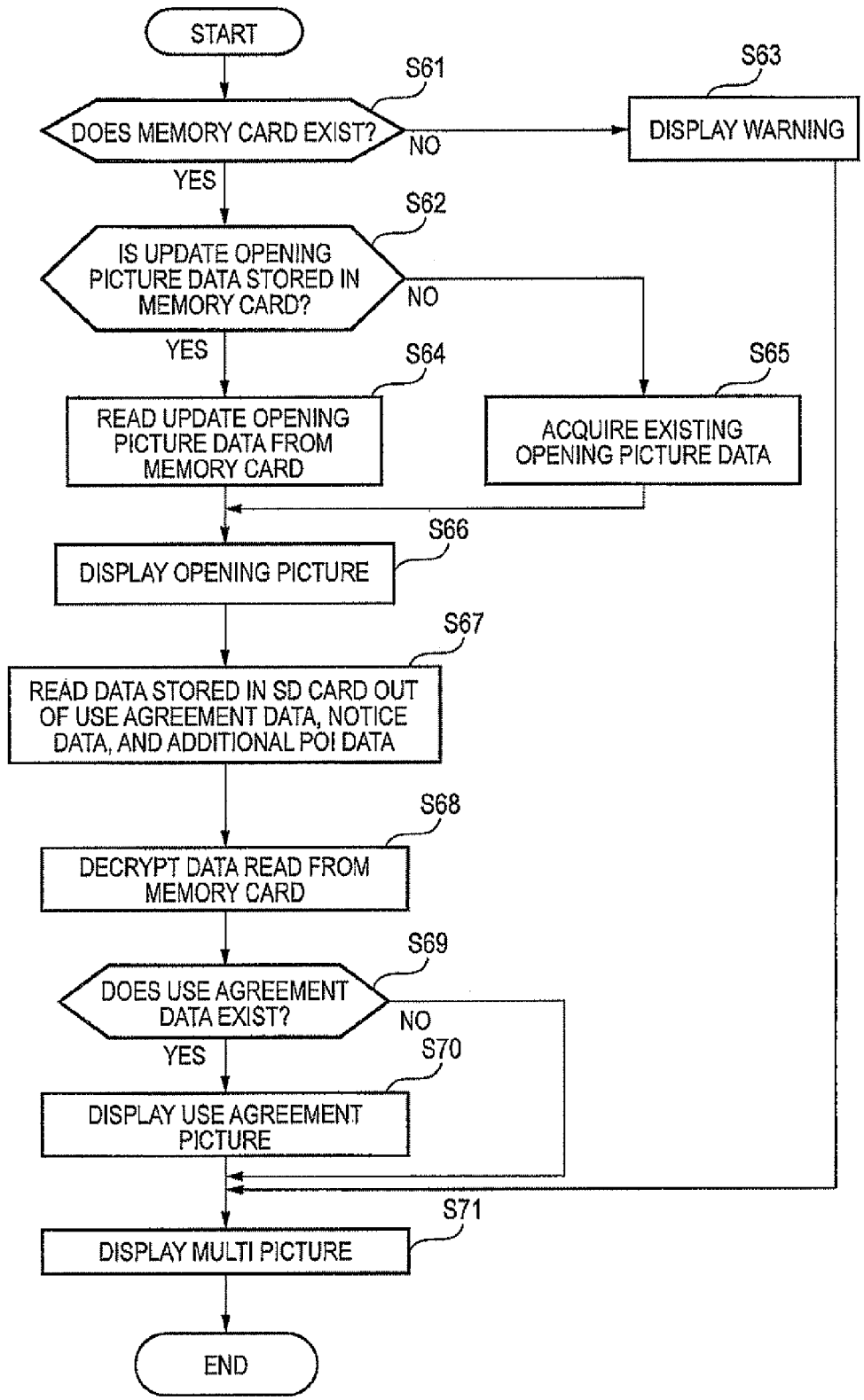
FIG. 5 is a flow diagram illustrating the flow of a starting process of the navigation system.

First, a starting behavior of the navigation system 1 will be described with reference to FIG. 5. FIG. 5 is a flow diagram illustrating a starting process of the navigation system 1. When the accessory power source of the vehicle is turned on and power is supplied to the navigation system 1, the controller 20 executes the computer program stored in the ROM. By executing the computer program, the functional sections shown in FIG. 4 are embodied. The initializing section 50 out of the functional sections is first activated.

When confirming that the memory card interface 17 works normally as a part of the initializing process, the initializing section 50 checks whether a memory card is inserted into the memory card interface 17 (S61). This check is performed, for example, depending on whether the standard memory area in the memory card can be accessed. When it is determined that a memory card is not inserted (NO in S61), the initializing section 50 displays a warning picture representing the determination (S63). The map data and the like are stored in the memory card. Accordingly, when the memory card is not inserted, the navigation system 1 cannot perform the navigation function. The initializing section 50 calls the user's attention to the fact that a memory card is not inserted by the use of the warning picture. The warning picture is displayed on the touch panel 21 by causing the initializing section 50 to read the picture data stored in advance in the ROM and to send the read picture data to the image processing section 57.

When it is determined that a memory card is inserted (YES in S61), the initializing section 50 checks whether the update opening picture data is stored in the customized memory area of the memory card (S62). When it is determined that the update opening picture data is stored in the memory card (YES in S62), the initializing section 50 reads the update opening picture data from the memory card (S64). On the other hand, when it is determined that the update opening picture data is not stored in the memory card (NO in S62), the initializing section 50 acquires existing opening picture data stored in advance in the ROM (S65). The initializing section 50 displays the opening picture on the touch panel 21 by sending the acquired update opening picture data or the existing opening picture data to the image processing section 57 (S66). That is, the initializing section 50 displays the opening picture on the basis of the update opening image data when the update opening image data could be acquired form the memory card, and displays the opening picture on the basis of the existing opening picture data when the update opening picture data could not be acquired.

Figure 6:
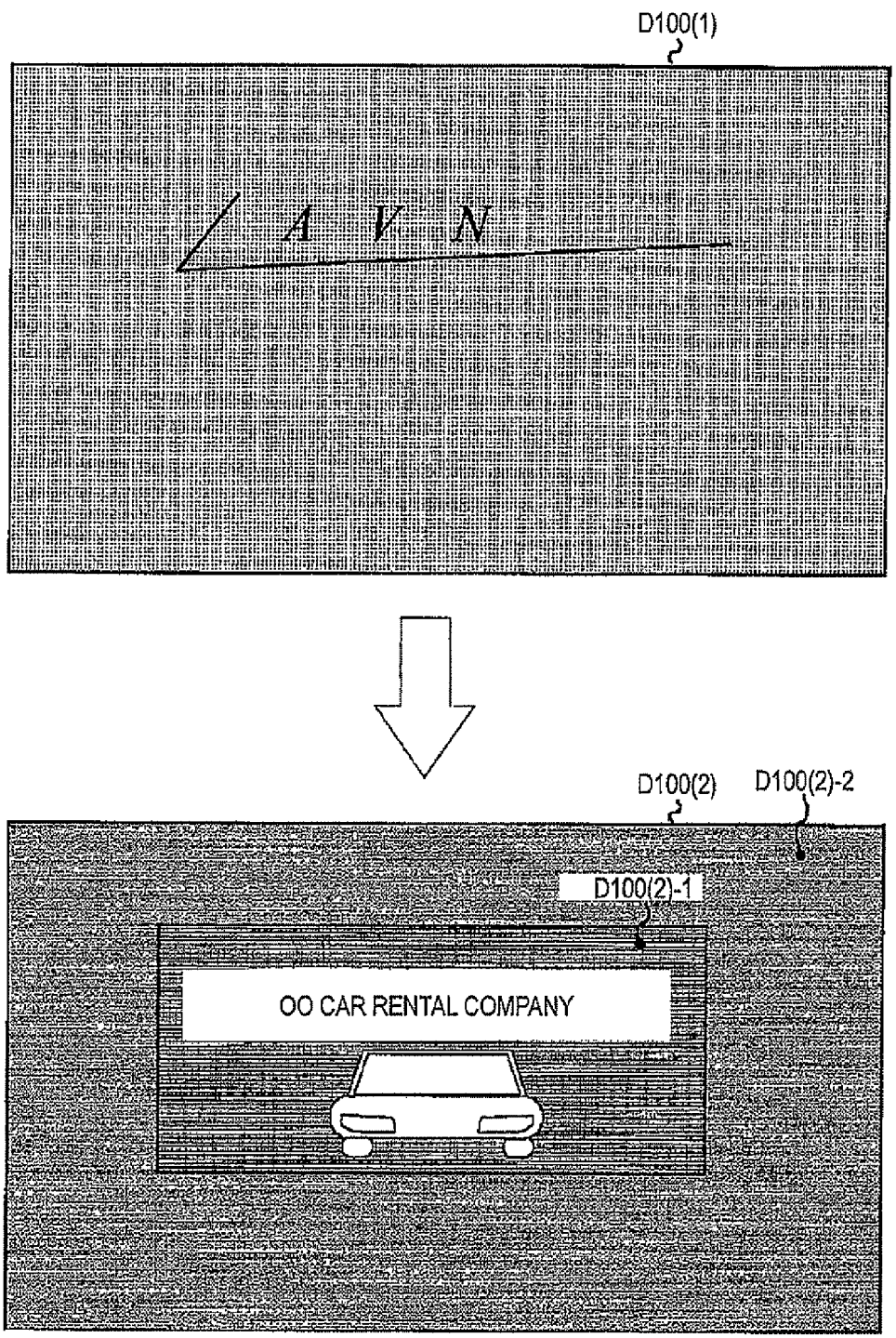
FIG. 6 is a diagram illustrating the concept of changing an opening picture.

FIG. 6 is a diagram illustrating the concept of changing the existing opening picture to the update opening picture. D100 (1) is the existing opening picture displayed on the basis of the existing opening picture data and for example, the product name of the navigation system 1 is displayed therein. D100(2) is the update opening picture displayed on the basis of the update opening picture data. As shown in FIG. 6, the car rental company mounting the navigation system 1 on a vehicle wants to change the picture to the opening picture like D100 (2) emphasizing its company name. In this case, the person in charge of the car rental company can change the picture to the desired opening picture by generating the update opening picture data for D100(2) by the use of a personal computer and storing the generated data in a memory card. When the navigation system 1 is mounted on a owner-driver vehicle or a commercial vehicle, the desired update opening picture data may be displayed similarly.

Here, the configuration of the update opening picture data will be described. For example, as shown in FIG. 6, the update opening picture data includes image data (D100(2)-1) displayed at the center and background data (D100(2)-2) displayed in the periphery thereof. The image data (D100(2)-1) is generated as a bit-map file and the background data (D100(2)-2) is generated as a binary field storing R values, G values, and B values of an RGB color model. The image data (D100(2)-1) is not limited to the bit-map format, but may be generated in the PNG (Portable Network Graphics) format, the GIF (Graphic Interchange Format) format, or the JPEG (Joint Photographic Experts Group) format. The background data (D100(2)-2) is not limited to the RGB color model, but may employ a CMYK color model. In this way, the update opening picture data includes the image data (D100(2)-1) storing an image smaller than the full display size and the background color designating data (D100(2)-2) in the periphery thereof. The image size of the image data can be determined in consideration of the capacity of the memory card. The number of colors designated in the background data may be one or a predetermined number. According to this configuration, it is possible to reduce the total data size of the update opening picture and to store the update opening picture data in a memory card of which the data capacity is limited. When a memory card having large data capacity can be used, the update opening picture data may include only the image data (D100(2)-1).

Subsequently, the initializing section 50 reads other application data stored in the customized memory area of the memory card (S67). The read application data includes use agreement data, notice data, and additional POI data. Since the read data are generated by a user such as a car rental company, the data may be encrypted from the viewpoint of private information protection. The update opening picture data may be encrypted similarly. The initializing section 50 decrypts the data by a predetermined method when the read data is encrypted (S68). The encryption method and the decryption method can employ known techniques and thus will not be described herein. The initializing section 50 stores the application data, which has been read from the memory card and has been decrypted as needed, in the RAM.

The initializing section 50 performs a predetermined initializing process including the above-mentioned process while displaying the opening picture. When the opening picture is being displayed, other functional sections of the controller 20 perform the following processes. The operation processing section 51 scans a signal from the operation receiving section 23, the operation buttons 24, or the reset button 18 and receives the user's operation. The positioning section 52 processes the positioning information acquired by the use of the GPS information receiver 9 or the signal from the vehicle speed detector 10 or the gyro sensor 19 and measures the position of the vehicle. The map data processing section 54 accesses the memory card inserted into the memory card interface 17 and reads the map data around the position of the vehicle measured by the positioning section 52. The initializing section 50 instructs the image processing section 57 to close the opening picture when the predetermined initializing process is ended or a predetermined time passes after the opening picture is displayed. Accordingly, the opening picture is displayed for several seconds after the navigation system 1 is started.

Subsequently, the initializing section 50 checks whether the use agreement data is included in the application data stored in the memory card (S69). When it is determined that the use agreement data is included (YES in S69), the initializing section 50 displays the use agreement picture subsequently to the opening picture by sending the use agreement data to the image processing section 57 (S70). The initializing section 50 does not display the use agreement picture when it is determined that the use agreement data is not included in the application data (NO in S69).

Figure 7:
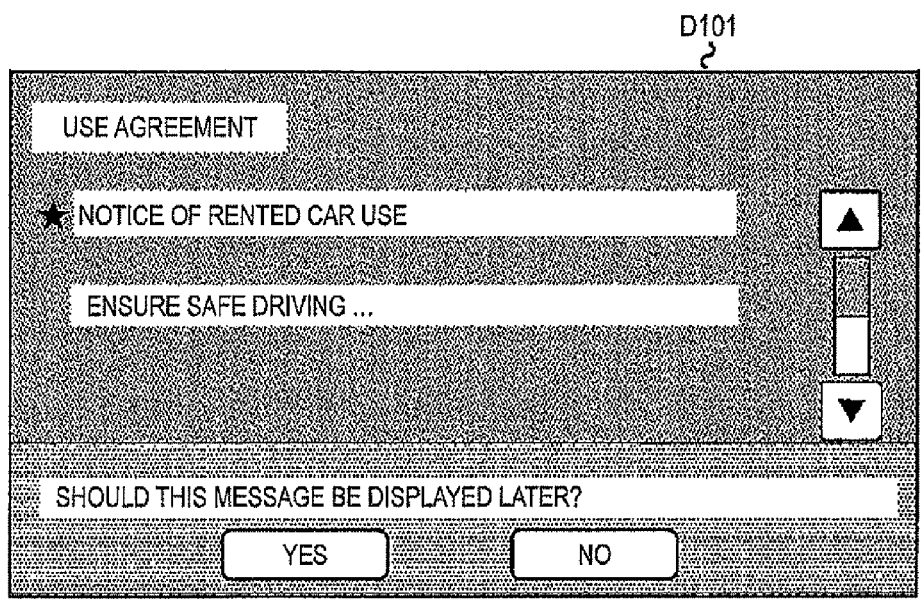
FIG. 7 is a diagram illustrating a use agreement picture.

FIG. 7 is a diagram illustrating an example of the use agreement picture. By displaying such a picture, the car rental company mounting the navigation system 1 on the vehicle can cause the user of the rented car to re-recognize the use agreement before using the navigation system 1. When an agreement operation is performed in the use agreement picture (D101), the use agreement picture (D101) is closed. The use agreement picture (D101) is generated on the basis of the use agreement data acquired and stored from the memory card by the initializing section 50. The use agreement data is generated as a text file including text information displayed on the use agreement picture. The person in charge of the car rental company can display a desired use agreement picture by generating the use agreement data including a text to be displayed in the use agreement picture by the use of a personal computer or the like and storing the generated data in the memory card. On the contrary, when it is not necessary to display the use agreement picture, the use agreement data is not stored in the memory card.

When the use agreement picture (D101) is closed, the initializing section 50 instructs the image processing section 57 to display a multi picture in which an AV operation picture and a navigation operation picture are combined on the touch panel 21 (S71).

In this way, in the navigation system 1, even when the opening picture is provided as a device in advance, the user can customize the opening picture depending on the usage of the navigation system 1. The opening picture is a picture first displayed as the time of starting the system and thus the degree of attention thereto is high. Therefore, the customization of the opening picture improves convenience, which is attractive to users. In the navigation system 1, the user can add a new picture such as the use agreement picture not provided as a device. In this case, the user can store text data in the memory card, thereby simply adding the new picture.

Display of Navigation Main Picture

Figure 8:
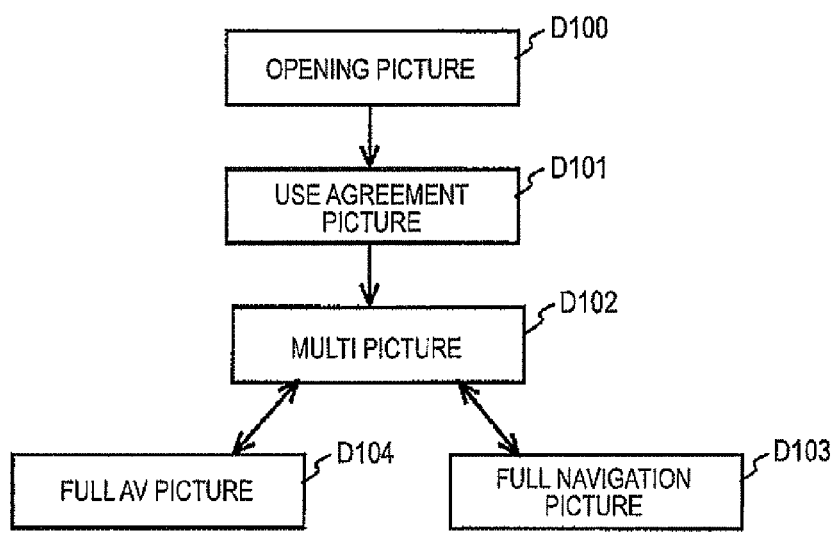
FIG. 8 is a diagram illustrating the change of a main picture in the navigation system.
Figure 9:
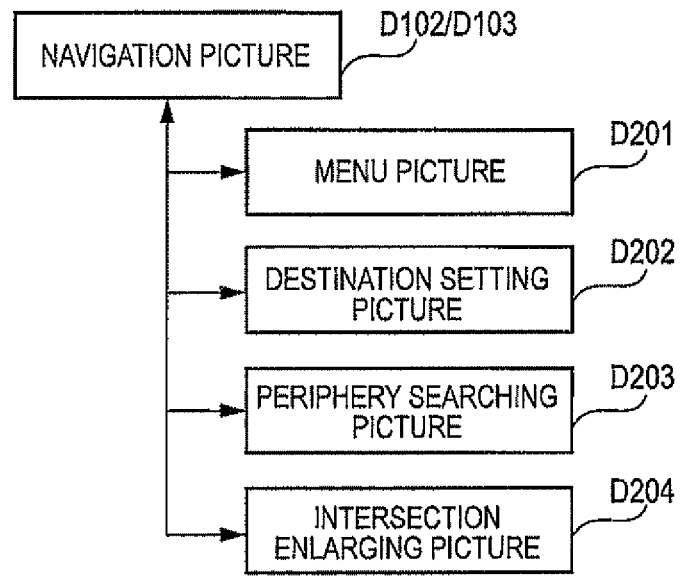
FIG. 9 is a diagram illustrating the change of pictures in the navigation system.
Figure 10:
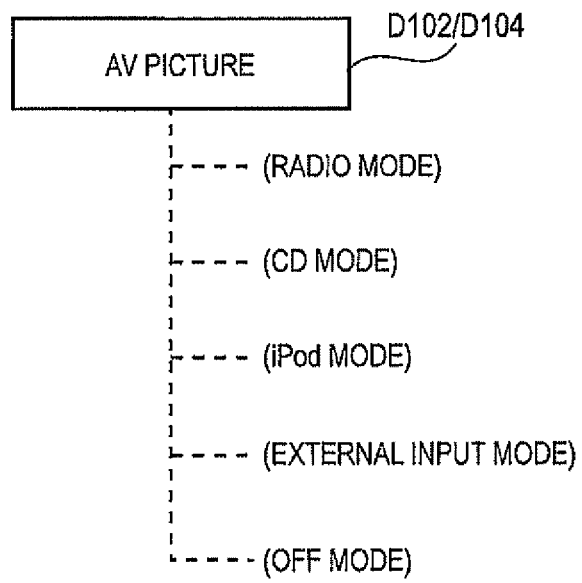
FIG. 10 is a diagram illustrating a display mode of an AV picture.

When the above-mentioned starting process (initializing process) is ended by the initializing section 50, main pictures for embodying the following navigation function are displayed. FIG. 8 is a diagram illustrating the change of the main pictures in the navigation system 1. The main pictures of the navigation system 1 include a multi picture (D102), a full navigation picture (D103), and a full AV picture (D104). The behavior of the navigation system 1 involved in the main pictures will be described below with reference to FIGS. 8 to 10. FIG. 9 is a diagram illustrating the change of the navigation picture. FIG. 10 is a diagram illustrating a display mode of the AV picture.

Figure 11:
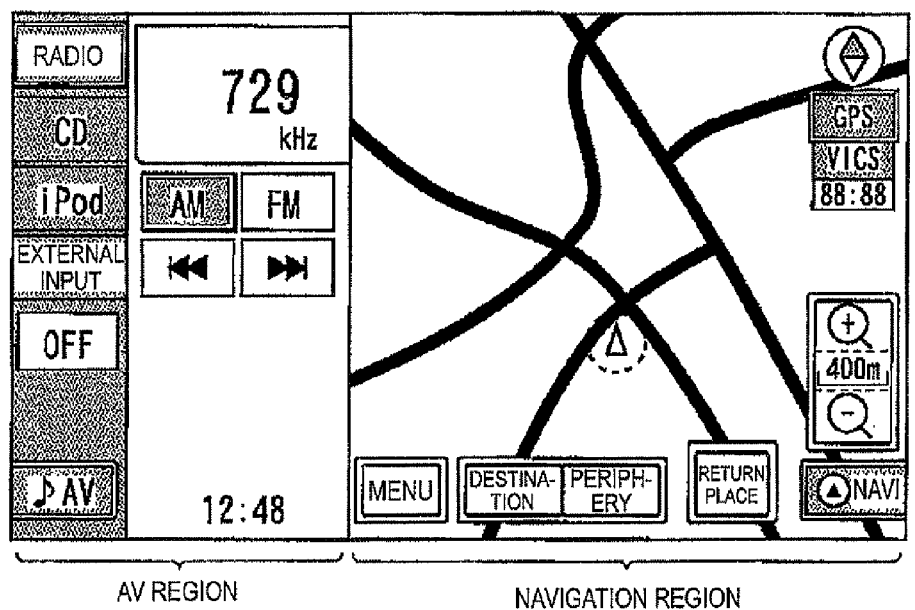
FIG. 11 is a diagram illustrating a multi picture.

When it is instructed to display the multi picture by the initializing section 50, the image processing section 57 generates the multi picture (D102) in which the AV operation picture and the navigation operation picture are combined on the basis of the image data of the operation buttons stored in the ROM or the map data read by the map data processing section 54, and displays the multi picture on the touch panel 21. FIG. 11 is a diagram illustrating an example of the multi picture. As shown in FIG. 11, the image processing section 57 displays the picture of the AV region in which AV operation buttons are arranged on the left side of the touch panel 21 and displays the picture of a navigation region in which a navigation map or the operation buttons are arranged on the right side of the touch panel 21.

As shown in FIG. 11, the image processing section 57 displays "radio", "CD", "iPod", "external input", "OFF", and "AV" buttons in the AV region. In the example shown in FIG. 11, "radio" is selected and a reception frequency, AM/FM switching buttons, channel selection buttons, and the like are displayed. At this time, the audio processing section 56 outputs an audio signal of the AM broadcast received by the broadcast receiver 7 from a speaker via the amplifier 12. When a One-Seg tuner is included in the broadcast receiver 7, a "One-Seg" button may be displayed in the AV region. On the other hand, the image processing section 57 displays "menu", "destination", "periphery", "return place", "navigation", "map enlargement", and "map reduction" buttons in addition to the map drawn on the basis of the map data read by the map data processing section 54.

Figure 12:
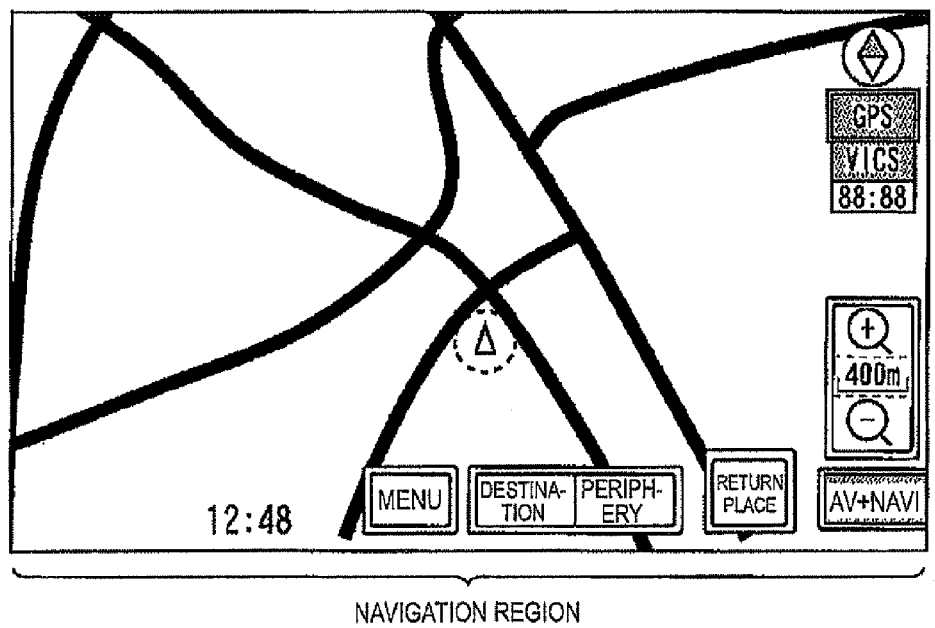
FIG. 12 is a diagram illustrating a full navigation picture.

FIG. 12 is a diagram illustrating an example of the full navigation picture. When the operation processing section 51 detects that the "navigation" button displayed in the multi picture (D102) is pressed, the image processing section 57 slowly hides the AV region and displays the navigation region on the entire screen. As shown in FIG. 12, the image processing section 57 deletes the AV region and displays the navigation region on the entire surface of the touch panel 21.

Like the multi picture (D102), map and operation buttons such as "menu" and "destination" are displayed in the navigation region. Here, the image processing section 57 displays a picture so that the icon of the vehicle displayed in the full navigation picture is located at the center of the navigation region. Accordingly, when the display picture of the touch panel 21 is changed from the multi picture (D102) to the full navigation picture (D103), the display of the icon of the vehicle or the map is slightly scrolled in the picture. On the other hand, the image processing section 57 displays a picture so that the operation buttons such as "menu" and "destination" are located at the same position in the display picture of the touch panel 21. Accordingly, even when the display picture of the touch panel 21 is changed from the multi picture (D102) to the full navigation picture (D103), the operation buttons for navigation are not scrolled on the screen of the touch panel 21 and but are displayed at the same positions. When the "AV+navigation" button is pressed, the image processing section 57 switches the displayed picture from the full navigation picture (D103) to the multi picture (D102).

Figure 13:
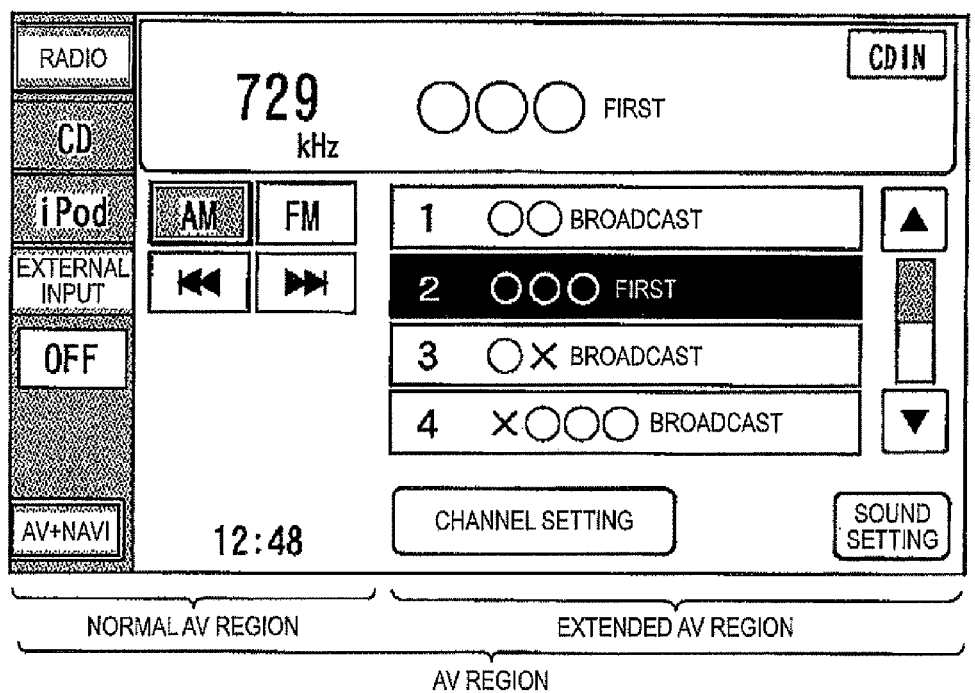
FIG. 13 is a diagram illustrating a full AV picture.

FIG. 13 is a diagram illustrating an example of the full AV picture. When the operation processing section 51 detects that the "AV" button displayed in the multi picture (D102) is pressed, the image processing section 57 slowly hides the navigation region and displays the AV region in the full picture. The image processing section 57 deletes the navigation region as shown in FIG. 13 and displays the AV region on the entire surface of the touch panel 21.

Like the multi picture (D102), "radio", "CD", "iPod", "external input", and "OFF" buttons are displayed in the AV region. Names of broadcast stations, preset channel selection buttons, a channel setting button, a sound setting button, which are not displayed in the multi picture (D102), are displayed in the AV region. In addition, "CDIN" representing that a CD is inserted into the CD drive 16 is displayed. Here, the operation buttons such as "radio" displayed in the multi picture (D102) are displayed at the same positions in the AV region. Hereinafter, the region displayed in both the multi picture (D102) and the full AV picture (D104) is referred to as a "normal AV region" and the region displayed in only the full AV picture (D104) is referred to as an "extended AV region". When the "AV+navigation" button is pressed, the image processing section 57 switches the displayed picture from the full AV picture (D104) to the multi picture (D102).

Figure 14:
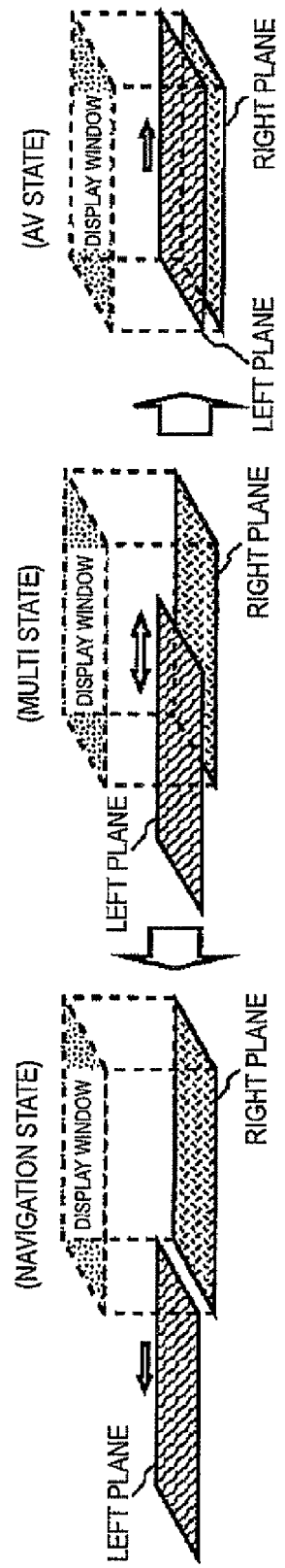
FIG. 14 is a conceptual diagram illustrating the change of main pictures.

FIG. 14 is a conceptual diagram illustrating the picture change of the main pictures. As shown in FIG. 14, the user can operate the main picture of the navigation system 1 with such an image that the left plane (corresponding to the AV picture in this embodiment) is picked up to the left over the right plane (corresponding to the navigation picture in this embodiment) as viewed from the display window. Therefore, it is easy to determine where it is and it is possible to operate the navigation system with ease.

The display mode of the AV picture in the navigation system 1 will be described below. As shown in FIG. 10, six pictures of a radio mode, a CD mode, an iPod mode, an external input mode, and an OFF mode are prepared as the AV picture of the navigation system 1. When any source selection button or the "OFF" button provided on the left side of the AV region is pressed, the image processing section 57 displays an AV operation picture corresponding thereto. For example, when the "radio" button is pressed, the image processing section 57 displays the frequency of the radio or the channel selection button shown in FIG. 11. The same is true of the CD or iPod button. When the "external input" button is pressed, the image processing section 57 displays the channel selection button in the AV region and switches the display of the navigation region to an image of an external audio/video input section 8. However, when the brake detector 4 detects that a parking brake signal is released, the image processing section 57 stops the image display from the broadcast receiver 7 or the external audio/video input section 8. When the broadcast receiver 7 includes the One-Seg tuner, an One-Seg mode is provided to the AV picture. When the "One-Seg" button is pressed, the channel selection button and the like are displayed in the AV region and the display of the navigation region is switched to the image from the broadcast receiver 7.

Figure 15:
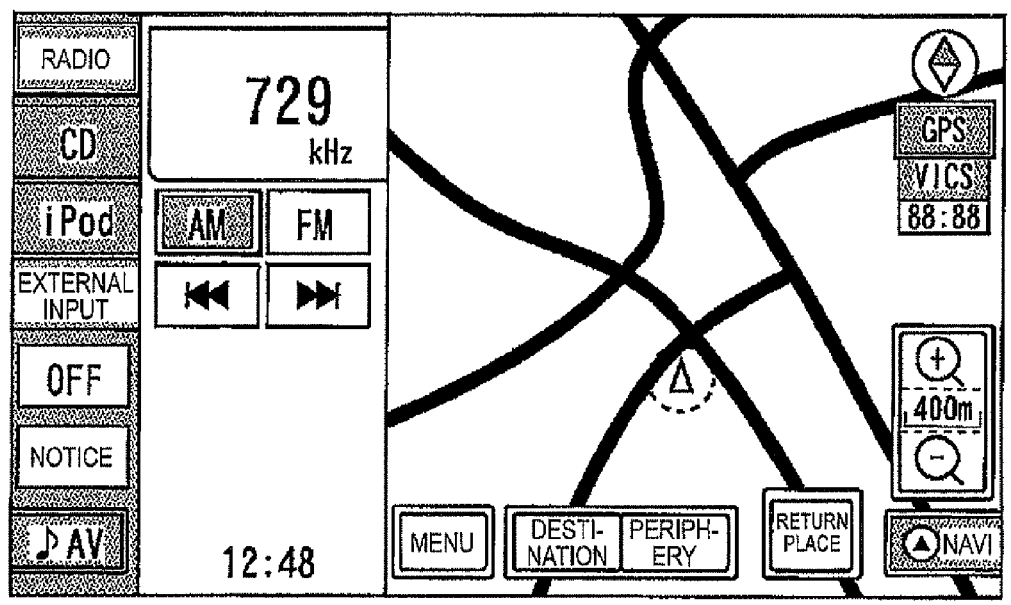
FIG. 15 is a diagram illustrating a multi picture to which a "notice" button is added.

The multi picture (D102) shown in FIG. 11 and the full AV picture (D104) shown in FIG. 13 are in an existing state. The ear rental company mounting the navigation system 1 on a vehicle can add a "notice" button for displaying a notice picture to the normal AV region by storing notice data in the customized area of the memory card. FIG. 15 is a diagram illustrating an example of the multi picture (D102) to which the "notice" button is added. In the example shown in FIG. 15, the "notice" button is displayed in an empty region below the "OFF" button in the normal AV region. In this case, the "notice" button is displayed at the same position in the full AV picture (D104).

Figure 16:
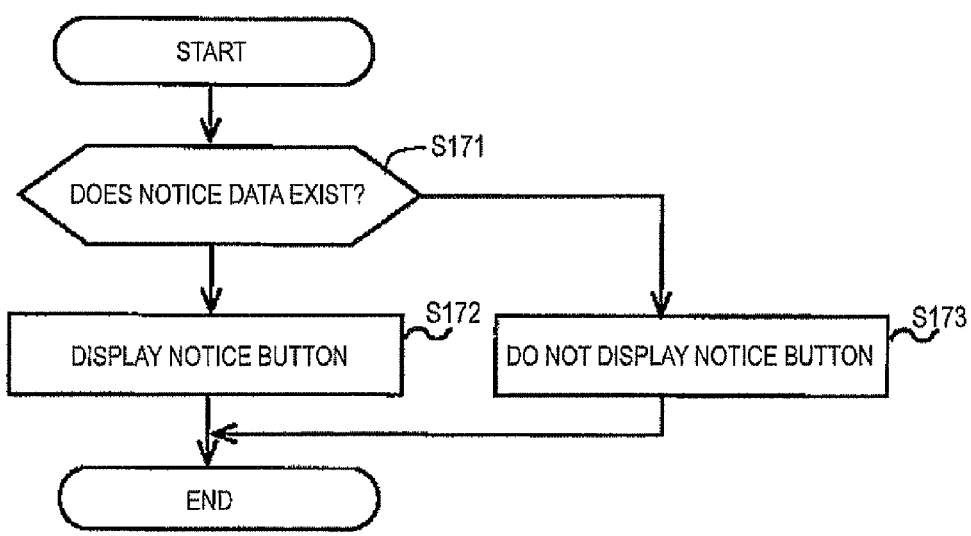
FIG. 16 is a flow diagram illustrating the flow of a process of displaying a multi picture and a full AV picture.

FIG. 16 is a flow diagram illustrating the process of displaying the multi picture and the full AV picture. At the time of displaying the multi picture (D102) or the full AV picture (D104), the image processing section 57 checks whether the notice data read and stored from the memory card by the initializing section 50 exists (S171). When it is determined that the notice data exists (YES in S171), the image processing section 57 displays the "notice" button in the normal AV region of the multi picture (D102) and the full AV picture (D104) (S172). On the other hand, when it is determined that the notice data does not exist (NO in S171), the image processing section 57 does not display the "notice" button, that is, displays the pictures in the existing state (S173).

Figure 17:
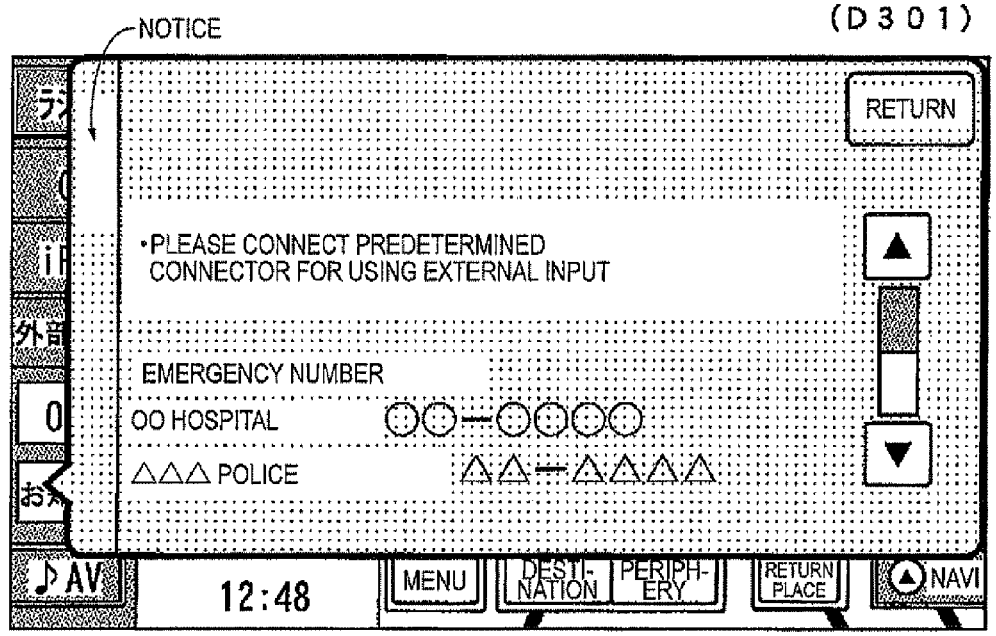
FIG. 17 is a diagram illustrating a notice picture.

FIG. 17 is a diagram illustrating an example of the notice picture. When the operation processing section 51 detects that the "notice" button disposed in the normal AV region of the multi picture (D102) and the full AV picture (D104), the image processing section 57 displays the notice picture (D301) shown in FIG. 17 on the touch panel 21. As shown in FIG. 17, the image processing section 57 displays the notice picture (D301) in a pop-up manner so as to rise up from the "notice" button in the AV region. The pop-up display means that when a button displayed in a picture is pressed, a picture corresponding to the button rises up from the button. The notice picture (D301) is generated on the basis of the notice data read from the memory card and stored by the initializing section 50. The notice data is generated as a text file including text information to be displayed in the notice picture. A person in charge of the car rental company can display a desired notice picture by generating the notice data including a text to be displayed in the notice picture by the use of a personal computer and the like and storing the generated data in the memory card. On the contrary, when it is not necessary to display the notice picture, the notice data is not stored in the memory card. For example, when the car rental company displays details frequently asked about by rented car users in the notice picture, it is possible to reduce inquiries from users.

In this was, according to the navigation system 1, a picture such as the above-mentioned use agreement picture to automatically be displayed can be added as a new picture not provided in advance as a device and a new picture such as the notice picture to be displayed by the operation of a predetermined button can be added. In this case, the user can display the "notice" button by storing the text data to be displayed on the screen in the memory card, and can display a desired notice picture when the button is operated.

The navigation picture of the navigation system 1 will be described below. When the operation processing section 51 detects that one of the "menu" button, the "destination" button, and the "periphery" button disposed in the navigation region of the multi picture (D102) or the full navigation picture (D103) is selected on the touch panel 21, the image processing section 57 displays the picture corresponding to the selected button on the touch panel 21.

Figure 18:
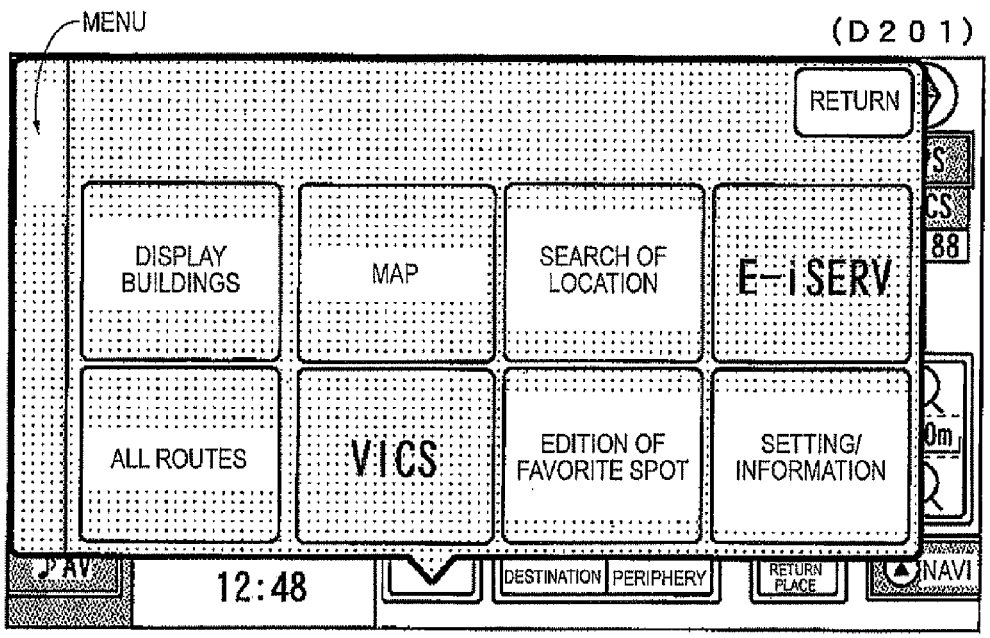
FIG. 18 is a diagram illustrating a menu picture.

FIG. 18 is a diagram illustrating an example of the menu picture (D201). When the operation processing section 51 detects that the "menu" button is pressed, the image processing section 57 displays the menu picture (D201) shown in FIG. 18 on the touch panel 21. As shown in FIG. 18, the image processing section 57 displays the menu picture (D201) in a pop-up manner so as to rise up from the "menu" button in the navigation region. Here, the image processing section 57 displays the menu picture (D201) in an animation manner so as to slowly rise from the "menu" button and so as to view the multi picture (D102) below the menu picture (D201). By displaying the menu picture in the pop-up manner, the user can easily visually understand that the menu picture is changed from the multi picture and can operate the menu picture at ease. A user setting button for displaying icons or buildings or an editing button for favorite spots are displayed in the menu picture (D201). The spot information and the like registered by the user are stored in the RAM of the controller 20 by the user data processing section 55.

Figure 19:
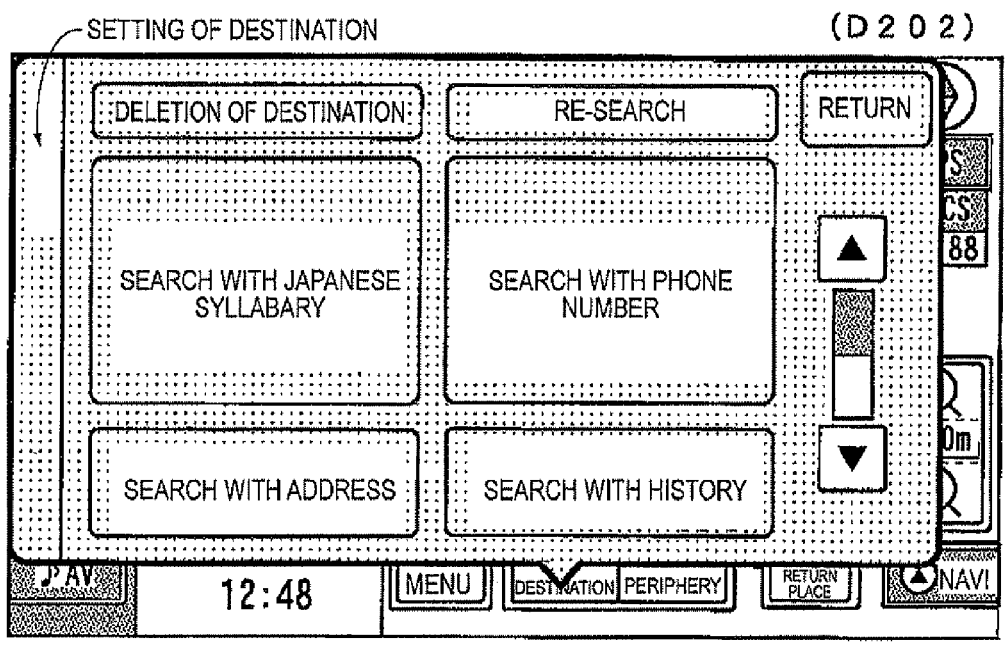
FIG. 19 is a diagram illustrating a destination setting picture.
Figure 20:
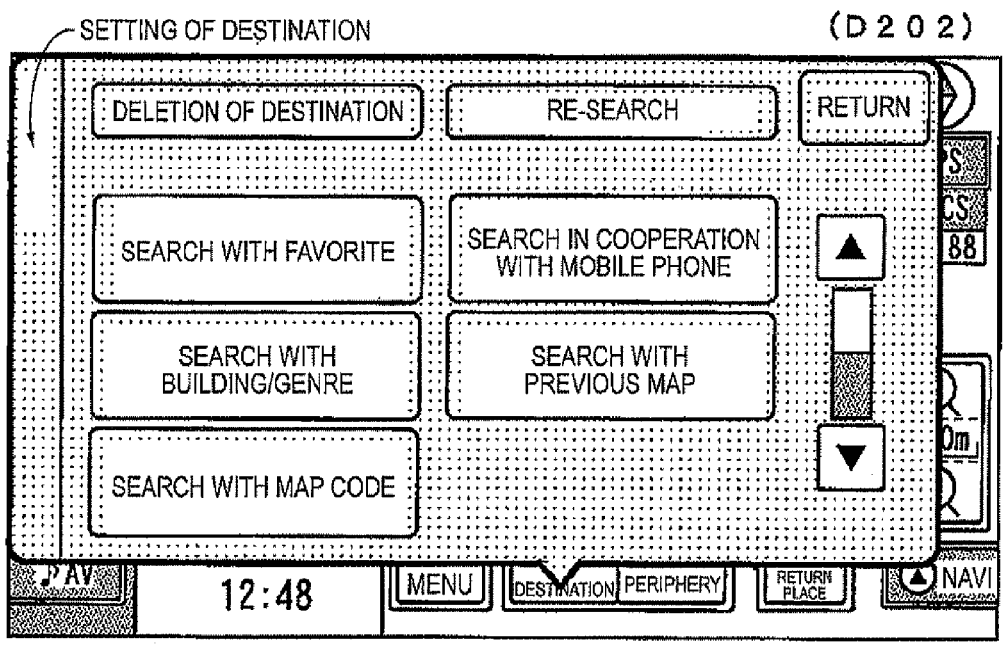
FIG. 20 is a diagram illustrating a destination setting picture.

FIGS. 19 and 20 are diagrams illustrating examples of the destination setting picture. When the operation processing section 51 detects that the "destination" button is pressed, the image processing section 57 displays a destination setting picture (D202) on the touch panel 21. The method of displaying the destination setting picture (D202) is the same as the above-mentioned menu picture (D201). As shown in FIGS. 19 and 20, plural buttons corresponding to plural destination selecting methods are displayed in the destination setting picture (D202). FIGS. 19 and 20 are switched to each other by selecting a scroll bar displayed on the right side of the destination setting picture (D202). As the destination selecting methods, selection methods using the Japanese syllabary, phone number, address, history, favorite, cooperation with mobile phone, building/genre, previous map, and map code are provided to correspond to the buttons. Among these selection methods, the selection methods using the Japanese syllabary, phone number, address, building/genre, and map code employ the POI data and the detailed POT data stored in the standard memory area of the memory card.

When the operation processing section 51 detects that a button for setting a destination is pressed, the image processing section 57 displays a picture corresponding to the pressed button. For example, the image processing section 57 displays a picture for inputting characters when the button "search with the Japanese syllabary" is pressed, displays a picture for selecting city and the like when the button "search with address", displays a picture for prompting a user to approach a mobile phone to the infrared receiving/emitting section 25 when the button "search with cooperation with mobile phone" is pressed, and displays destinations having been searched for when the button "search with history" is pressed. Communication data provided from the mobile phone via the infrared receiving/emitting section 25 includes position information such as latitude and longitude of a destination, an address, and a phone number. When the destination is set using these several setting methods, the route guiding section 53 searches for the shortest route from the position of the vehicle measured by the positioning section 52 to the destination and starts the route guidance.

Figure 21:
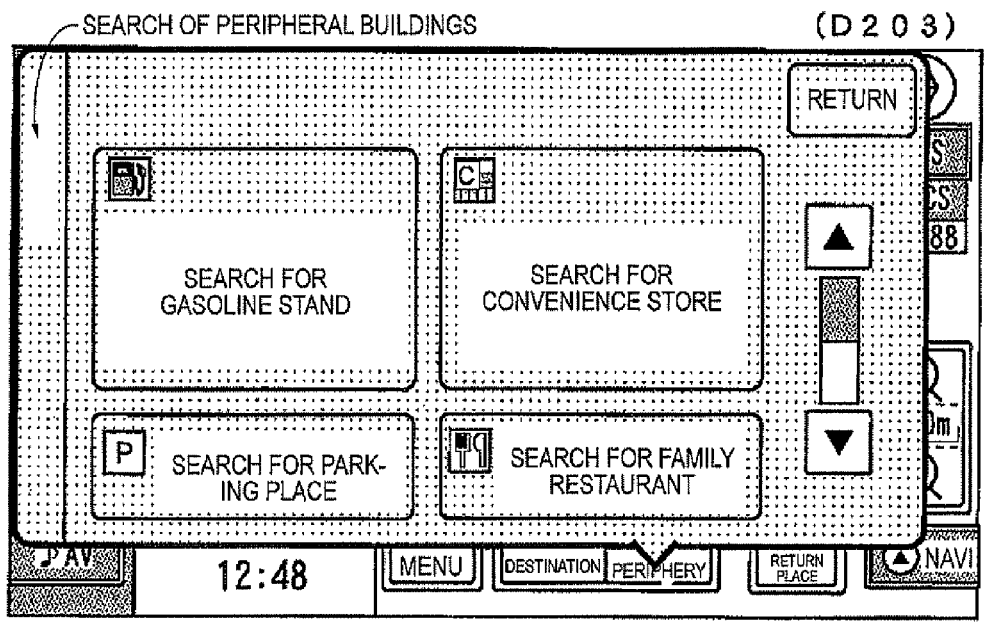
FIG. 21 is a diagram illustrating a periphery searching picture.
Figure 22:
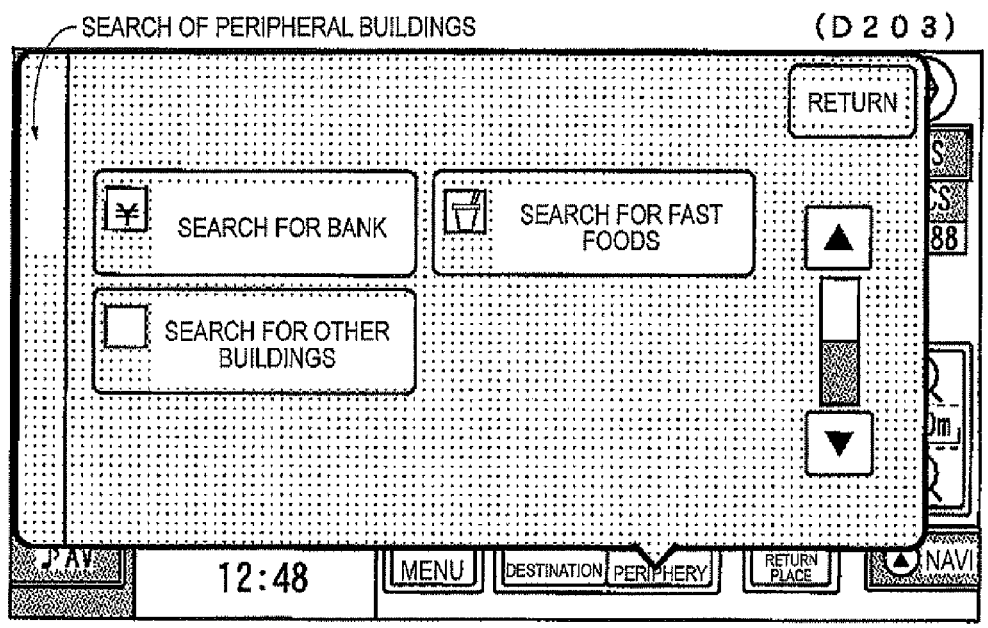
FIG. 22 is a diagram illustrating a periphery searching picture.

FIGS. 21 and 22 are diagrams illustrating examples of the periphery searching picture. When the operation processing section 51 detects that the "periphery" button is pressed, the image processing section 57 displays the periphery searching picture (D203) on the touch panel 21. This display method is the same pop-up display as the destination setting picture (D202). As shown in FIGS. 21 and 22, plural buttons corresponding to categories to be searched for are displayed in the periphery searching picture (D203). FIGS. 21 and 22 are switched to each other by selecting a scroll bar displayed on the right side of the periphery searching picture (D203). As the categories to be searched for, gasoline stands, conveniences (convenience stores), parking areas, families (family restaurants), banks, fast foods, and other buildings are provided to correspond to the buttons. The POI data and the detailed POI data stored in the standard memory area of the memory card are used to display the buildings to be searched for. When the operation processing section 51 detects that a button corresponding to a category to be searched for is pressed, the image processing section 57 sequentially searches for the buildings (POI) belonging to the category from the building closest to the position of the vehicle and displays a list.

Figure 23:
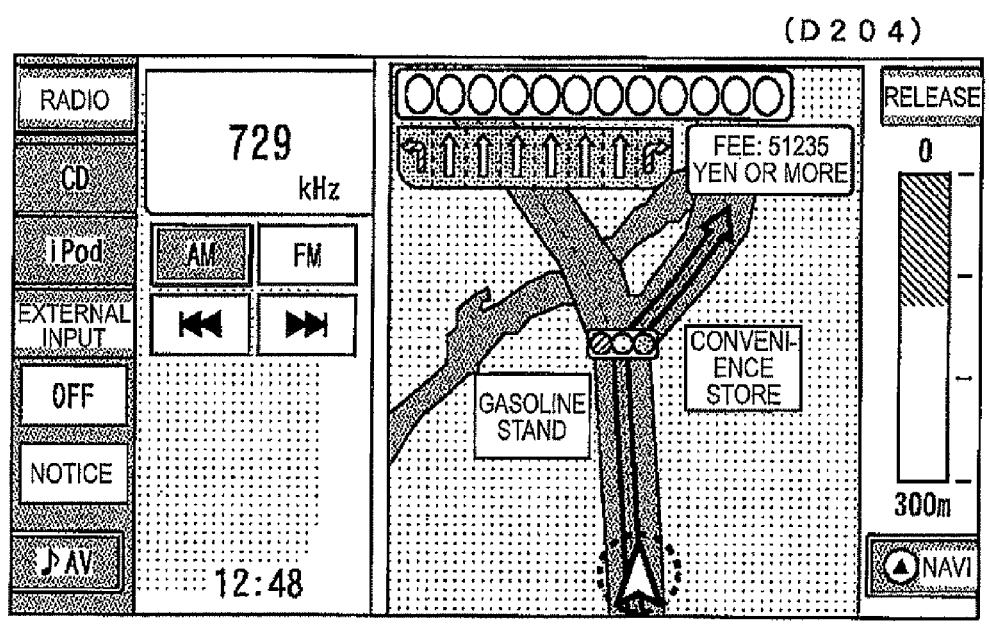
FIG. 23 is a diagram illustrating an intersection enlarging picture.

When a destination is set in the destination setting picture (D202) or the periphery searching picture (D203), the route guiding section 53 starts the route guidance. The route guiding section 53 performs the route guidance on the basis of the position of the vehicle measured by the positioning section 52 and the map data read from the memory card by the map data processing section 54. When the vehicle comes close to an intersection at which the vehicle turns to right or left, the route guiding section 53 displays the intersection enlarging picture (D204) shown in FIG. 23 and transmits route-guidance audio data to the audio processing section 56. FIG. 23 is a diagram illustrating an example of the intersection enlarging picture (D204). As shown in FIG. 23, an enlargement of the intersection is displayed in the navigation region and a path along which the vehicle should travel is displayed as an arrow. At this time, audio/visual operation buttons are displayed in the AV region.

Setting of Destination

The destination setting behavior of the navigation system 1 will be described below. As the methods of setting a destination, the navigation system 1 provides a setting method (hereinafter, referred to as a "first setting method") using the destination setting picture (D202) or the periphery searching picture (D203), a method of setting as a destination a service office of the car rental company registered as a return place of the rented car in advance by pressing the "return place" button displayed on the multi picture (D102) or the full navigation picture (D103), and a method (hereinafter, referred to as a "second setting method") of setting a spot indicated by a spot icon as a destination by selecting the spot icon displayed in the navigation region of the multi picture (D102) or the full navigation picture (D103). The destination set by these methods is normally one spot included in the POI data stored in the standard memory area of the memory card and is managed by the user data processing section 55.

The navigation system 1 according to this embodiment allows a user such as a car rental company to add a spot which can be set as a destination. The person in charge of the car rental company can allow an operator to select the added spot as a destination in the navigation system 1 by generating spot information (additional POT data) to be added by the use of a personal computer or the like and storing the generated spot information in the customized memory area of the memory card. The additional POI data includes POI data such as latitude information and longitude information and detailed POT data such as building name, address, phone number, and genre name for each spot to be added. The additional POI data includes icon data of the added POIs. Hereinafter, the POI data and the detailed POI data stored in the standard memory area of the memory card are also referred to as standard POI data. In general, buildings such as convenience stores and gasoline stands to which general drivers can easily drop in, famous buildings such as popular spots, or large-scaled buildings are included as the spot information in the standard POI data. New buildings or spots, minor buildings or spots such as service offices, and the like are not included in the standard POI data. Accordingly, when a user wants to set the buildings or spots as a destination, the spots can be added to the additional POI data.

Figure 24:
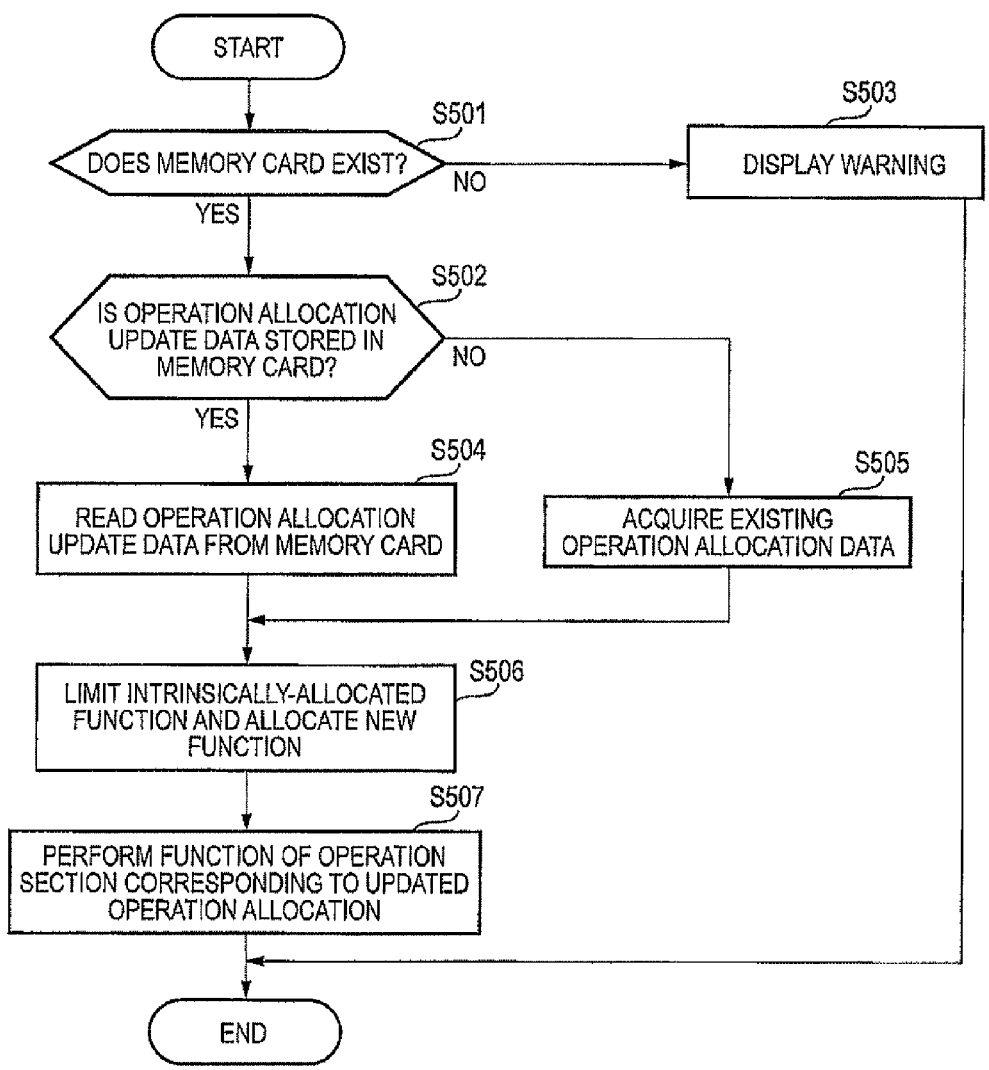
FIG. 24 is a flow diagram illustrating a switching control process.

The switching control process will be described below. The switching control process is one of the functions of the navigation system 1 according to this embodiment which are customized for a rented car. FIG. 24 is a flow diagram illustrating the switching control process. When it is confirmed that the memory card interface 17 normally works as a part of the initializing process, the initializing section 50 checks whether a memory card is inserted into the memory card interface 17 (S501). This check is performed, for example, on the basis of whether it can access the standard memory area of the memory card. When it is determined that the memory card is not inserted (NO in S501), the initializing section 50 displays a warning picture representing the determination (S503).

When it is determined that the memory card is inserted (YES in S501), the initializing section 50 checks whether operation allocation update data for updating a function allocated to an operation allocating button is stored in the customized memory area of the memory card (S502). When it is determined that the operation allocation update data is stored in the memory card (YES in S502), the initializing section 50 reads the operation allocation update data from the memory card and reports a message representing the fact to the operation processing section 51 (S504). On the other hand, when it is determined that the operation allocation update data is not stored in the memory card (NO in S502), the initializing section 50 acquires existing operation allocation data stored in advance in the ROM.

Subsequently, the operation processing section 51 limits the function intrinsically allocated to an operation on a soft button (button image) displayed as an icon in the switching operation picture of the touch panel 21 on the basis of the operation allocation data and allocates a new function to an operation other than the operation intrinsically received from the switching button 24a (S506). Here, FIG. 25 shows an example of the operation allocation data. As shown in the drawing, in this embodiment, the function of the FULLY OPEN button displayed in the switching operation picture of the touch panel 21 is limited. Specifically, the FULLY OPEN button is deleted from the switching operation picture of the touch panel 21. The FULLY OPEN function is allocated to a long-pressing operation other than a short-pressing operation intrinsically received by the switching button 24a as a mechanical button disposed below the touch panel 21. Accordingly, since the user of the rented car cannot perform the FULLY OPEN operation in the switching operation picture, the card insertion port 28 is hidden. As a result, it is possible to suppress the theft of the memory card inserted into the card insertion port 28. On the other hand, the hardware structure of the navigation system 1 can be used in common to rented cars and owner-driver cars.

The operation allocation data is only an example and the limitation of the intrinsically-allocated function and the allocation of a new function by the operation processing section 51 can be carried out by combining the operation buttons (mechanical buttons and soft buttons displayed on the touch panel) of the navigation system 1 as much as possible. For example, a new function is allocated to the long-pressing operation on the switching button 24a in the above-mentioned embodiment, but the invention is not limited to this configuration. For example, the FULL OPEN operation may be allowable when the switching button 24a is pressed by a predetermined number of times, or the FULL OPEN operation may be allowable when the switching button 24a+ the current position button 24b is pressed. The function may be limited by deactivating the short-pressing operation on the FULLY OPEN button without deleting the FULLY OPEN button from the switching operation picture of the touch panel 21. In this case, when a soft button in the switching operation picture of the touch panel 21 is long-pressed, or when a soft button is pressed by a predetermined number of times, the FULLY OPEN operation may be allowable. For example, a password may be requested for being input through the touch panel. In this embodiment, the operation processing section 51 limits the movement of the display unit 3 to the fully-opened position and removes the limitation when the operation button 24 (for example, the switching button 24a) receives an operation (for example, long-pressing) other than the intrinsically-received operation. In other words, the operation processing section 51 limits the movement of the display unit 3 based on the operation on a soft button displayed as an icon in the switching operation picture on the basis of the operation allocation data, allocates the function of the movement to the operation button 24 (for example, the switching button 24a), and allows the movement of the display unit 3 using the operation button 24.

FIG. 26B is a diagram illustrating the switching operation picture updated on the basis of the operation allocation update data. FIG. 26A is a diagram illustrating the pre-update operation picture as a comparative example of FIG. 26B. As shown in the drawings, in this embodiment, the function of the FULLY OPEN button as a soft button is limited, that is, the display thereof on the touch panel is deleted.

The operation processing section 51 controls the operation section corresponding to the updated operation allocation. (S507). That is, the operation processing section 51 sets the display unit to the "fully-opened" state when the switching button 24a is long-pressed.

By allowing the person in charge of the car rental company to generate the operation allocation data by the use of a personal computer and to store the generated data in the memory card, the operation allocation data can limit the intrinsically-allocated function and allocate a new function. Although it has been described in the above-mentioned embodiment that the operation allocation data can be updated by the use of the memory card, the operation allocation data may be changed by the navigation system 1.

As a result, it is possible to limit the unloading of a portable recording medium received in the navigation system without changing the hardware structure of the navigation system 1.

Modified Examples

In the above-mentioned embodiment, it has been exemplified that the navigation system 1 is mounted on a rented car and thus the "return place" button is displayed in the navigation region of the multi picture (D102) and the full navigation picture (D103). However, a "home" button or a "workplace" button may be displayed instead of the "return place" depending on the usage of a vehicle mounted with the navigation system 1.

Although the POI data which can be customized by a user is referred to as the additional POI data in the above-mentioned embodiment, it may be referred to as update POI data so as to cope with the case where the spot information included in the standard POI data is changed. In this case, building identification information (hereinafter, referred to as building ID) for identifying the building (spot) existing at the spot is included in the standard POI data and the update POI data. That is, a new building ID is given by the use of a personal computer or the like when it is intended to add a new building or spot to the update POI data, and the corresponding spot information is set in the update POI data by the use of the building ID used in the standard POI data when it is intended to change the position or the name of the building included in the standard POI data.

This application claims priority from Japanese Patent Application No. 2008-253665, filed on Sep. 30, 2008, the contents of which are incorporated herein by reference.

REFERENCE SIGNS LIST

1: NAVIGATION SYSTEM
2: MAIN UNIT
3: DISPLAY UNIT
17: MEMORY CARD INTERFACE
20: CONTROLLER
21: TOUCH PANEL
22: DISPLAY PROCESSING SECTION
23: OPERATION RECEIVING SECTION
28: CARD INSERTION PORT
50: INITIALIZING SECTION
51: OPERATION PROCESSING SECTION
52: POSITIONING SECTION
53: ROUTE GUIDING SECTION
54: MAP DATA PROCESSING SECTION
55: USER DATA PROCESSING SECTION
56: AUDIO PROCESSING SECTION
57: IMAGE PROCESSING SECTION

The invention claimed is:

1. A navigation system, comprising:
    a main unit;
    a first medium insertion port disposed on a front surface of the main unit, the first medium insertion port through which a first portable recording medium is loaded into or unloaded from the main unit;
    a second medium insertion port disposed on the front surface of the main unit, the second medium insertion port through which a second portable recording medium is loaded and unloaded;
    a display unit disposed on the front surface of the main unit, the display unit being movable between a closed position where the first and second medium insertion ports are covered and an opened position where the first and second medium insertion ports are exposed;
    a limitation section that limits movement of the display unit to the opened position;
    a removing section that removes limitation by the limitation section; and
    an operation section that receives an operation on the navigation system,
        wherein the removing section removes limitation by the limitation section when the operation section receives a special operation which is different from a normal operation,
        wherein the second portable recording medium stores map information and update information for displaying a move button on the display unit selectable to cause the display unit to move to the opened position and, when the second portable recording medium stores the update information, the limitation section limits the functionality allocated to the move button to limit the movement of the display unit to the opened position,
        wherein a position of the first medium insertion port on the front surface of the main unit is different from a position of the second medium insertion port, and
        wherein the display unit is movable among the closed position where both the first medium insertion port and the second medium insertion port are covered, a semi-opened position where only the second medium insertion port is covered by the display unit, and the opened position where both the first medium insertion port and the second medium insertion port are exposed.

2. The navigation system according to claim 1,
    wherein the display unit includes a touch panel on which first operation buttons as immaterial objects receiving an operation on the navigation system are displayed, and
    wherein the operation section includes second operation buttons as material objects disposed in the display unit.

3. The navigation system according to claim 2,
    wherein the touch panel can display the move button for causing the display unit to move to the opened position, and
    wherein the limitation section limits the movement of the display unit to the opened position by limiting display of the move button.

4. The navigation system according to claim 1,
    wherein the special operation is a long-pressing operation on the operation section, and
    wherein the removing section removes limitation by the limitation section when the operation section receives the long-pressing operation.

5. The navigation system according to claim 4, further comprising:
    an information acquiring section that acquires predetermined information stored in the first or the second portable recording medium; and
    a change section that changes the special operation on the basis of change information when the predetermined information includes the change information for changing the special operation.

6. The navigation system according to claim 1,
    wherein the navigation system is configured to perform bidirectional communication with a mobile phone.

7. The navigation system according to claim 1, further comprising:
an initializing section that determines whether the update information is stored in the second portable recording medium.

8. The navigation system according to claim 1, wherein when the second portable recording medium stores the update information and the limitation section limits the functionality allocated to the move button, the functionally allocated to the move button is allocated to a mechanical button.

9. A navigation system comprising:
a main unit;
a first medium insertion port disposed on a front surface of the main unit, the first medium insertion port through which a first portable recording medium storing update information for updating a function of the navigation system is loaded into or unloaded from the main unit;
a second medium insertion port disposed on the front surface of the main unit, the second medium insertion port through which a second portable recording medium is loaded and unloaded;
a display unit disposed on the front surface of the main unit, the display unit that displays an operation button for receiving an operation on the navigation system by the use of a touch panel, and the display unit capable of performing moving operation between a closed position where the first and second medium insertion ports are covered and an opened position where the first and second medium insertion ports are exposed by an operation of the operation button;
an operation section that receives an operation on the navigation system;
a limitation section that limits the moving operation of the display unit by an operation of the operation button on the basis of the update information stored in the second portable recording medium; and
a removing section that removes limitation of the moving operation by the limitation section when the operation section is operated with a predetermined operation,
wherein the second portable recording medium stores map information and update information for displaying a move button on the display unit selectable to cause the display unit to move to the opened position and, when the second portable recording medium stores the update information, the limitation section limits the functionality allocated to the move button to limit the movement of the display unit to the opened position,
wherein a position of the first medium insertion port on the front surface of the main unit is different from a position of the second medium insertion port, and
wherein the display unit is movable among the closed position where both the first medium insertion port and the second medium insertion port are covered, a semi-opened position where only the second medium insertion port is covered by the display unit, and the opened position where both the first medium insertion port and the second medium insertion port are exposed.

10. The navigation system according to claim 9, wherein the predetermined operation is a special operation which is different from a normal operation on the operation section.

11. The navigation system according to claim 9, wherein the predetermined operation is an operation of long-pressing the operation section.

12. The navigation system according to claim 9, wherein the display unit does not display an operation button regarding an operation limited by the limitation section.

13. The navigation system according to claim 9,
wherein the navigation system is configured to perform bidirectional communication with a mobile phone.

14. The navigation system according to claim 9, further comprising:
an initializing section that determines whether the update information is stored in the second portable recording medium.

15. The navigation system according to claim 9, wherein when the second portable recording medium stores the update information and the limitation section limits the functionality allocated to the move button, the functionally allocated to the move button is allocated to a mechanical button.

* * * * *